United States Patent
Richardson et al.

(10) Patent No.: US 7,907,394 B2
(45) Date of Patent: *Mar. 15, 2011

(54) PROTECTIVE ENCLOSURE FOR TOUCH SCREEN DEVICE

(75) Inventors: Curtis R. Richardson, Fort Collins, CO (US); Alan Morine, Fort Collins, CO (US); Jamie Lee Johnson, Fort Collins, CO (US); Brian P. Thomas, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,522

(22) Filed: Sep. 5, 2008

(65) Prior Publication Data

US 2009/0009945 A1 Jan. 8, 2009

Related U.S. Application Data

(63) Continuation-in-part of application No. 11/466,342, filed on Aug. 22, 2006, now Pat. No. 7,663,879, which is a continuation of application No. 11/270,732, filed on Nov. 8, 2005, now Pat. No. 7,230,823, which is a continuation of application No. 10/645,439, filed on Aug. 20, 2003, now Pat. No. 6,995,976, which is a continuation of application No. 10/300,200, filed on Nov. 19, 2002, now Pat. No. 6,646,864.

(60) Provisional application No. 60/335,865, filed on Nov. 19, 2001.

(51) Int. Cl.
*G06F 1/16* (2006.01)

(52) U.S. Cl. ............ 361/679.3; 361/679.02; 361/679.56; 312/223.1; 312/223.2

(58) Field of Classification Search ............. 361/679.32, 361/679.55, 679.56

See application file for complete search history.

(56) References Cited

U.S. PATENT DOCUMENTS

| | | | |
|---|---|---|---|
| 1,065,898 A | 6/1913 | Goerdes |
| 2,392,787 A | 1/1946 | Vermot |
| 2,478,987 A | 8/1949 | Vacheron |
| D216,853 S | 3/1970 | Schurman |
| D220,233 S | 3/1971 | Schurman |
| D275,822 S | 10/1984 | Gatland et al. |
| 4,703,161 A | 10/1987 | McLean |
| 4,762,227 A | 8/1988 | Patterson |
| 5,092,459 A | 3/1992 | Uljanic et al. |
| D327,646 S | 7/1992 | Hardigg et al. |
| D329,747 S | 9/1992 | Embree |
| D330,329 S | 10/1992 | Brightbill |
| 5,175,873 A | 12/1992 | Goldenberg et al. |
| D335,220 S | 5/1993 | Ward |
| D342,609 S | 12/1993 | Brightbill |

(Continued)

OTHER PUBLICATIONS

Design U.S. Appl. No. 29/246,914, filed May 19, 2006.

(Continued)

*Primary Examiner* — Jayprakash N Gandhi
*Assistant Examiner* — Anthony Q Edwards

(57) ABSTRACT

A protective enclosure for a personal electronic device having a shell that is capable of enclosing and substantially surrounding the electronic device disposed to make the shell substantially watertight, substantially rigid and substantially crush-resistant. The enclosure has a transparent protective membrane that is attached to the shell so that the protective membrane is positioned over the touch screen of the electronic device when the electronic device is enclosed in the shell.

26 Claims, 34 Drawing Sheets

U.S. PATENT DOCUMENTS

| | | | |
|---|---|---|---|
| D347,324 S | 5/1994 | Dickenson | |
| D347,732 S | 6/1994 | Wentz | |
| D353,048 S | 12/1994 | VanSkiver et al. | |
| 5,505,328 A | 4/1996 | Stribiak | |
| D381,512 S | 7/1997 | Green | |
| D386,611 S | 11/1997 | Sheu | |
| D402,105 S | 12/1998 | Erickson | |
| D409,374 S | 5/1999 | Laba et al. | |
| D412,062 S | 7/1999 | Potter et al. | |
| D413,202 S | 8/1999 | Schmitt et al. | |
| D413,203 S | 8/1999 | Zurwelle et al. | |
| D419,297 S | 1/2000 | Richardson et al. | |
| D419,767 S | 2/2000 | Richardson et al. | |
| D419,768 S | 2/2000 | Richardson et al. | |
| 6,031,524 A | 2/2000 | Kunert | |
| 6,041,924 A | 3/2000 | Tajima | |
| 6,049,813 A | 4/2000 | Danielson et al. | |
| D423,772 S | 5/2000 | Cooper et al. | |
| 6,068,119 A * | 5/2000 | Derr et al. | 206/305 |
| 6,073,770 A | 6/2000 | Park | |
| 6,094,785 A * | 8/2000 | Montgomery et al. | 24/324 |
| D433,798 S | 11/2000 | Weinstock | |
| 6,147,858 A | 11/2000 | Takahashi | |
| D439,407 S | 3/2001 | Parker | |
| 6,215,474 B1 | 4/2001 | Shah | |
| 6,239,968 B1 | 5/2001 | Kim et al. | |
| D443,133 S | 6/2001 | Richardson et al. | |
| 6,273,252 B1 | 8/2001 | Mitchell | |
| 6,301,100 B1 | 10/2001 | Iwata | |
| 6,313,892 B2 | 11/2001 | Gleckman | |
| 6,317,313 B1 | 11/2001 | Mosgrove et al. | |
| 6,388,877 B1 | 5/2002 | Canova, Jr. et al. | |
| 6,396,769 B1 | 5/2002 | Polany | |
| 6,415,138 B2 * | 7/2002 | Sirola et al. | 455/90.1 |
| 6,417,056 B1 | 7/2002 | Quek | |
| 6,445,577 B1 | 9/2002 | Madsen et al. | |
| 6,456,487 B1 * | 9/2002 | Hetterick | 361/679.3 |
| 6,471,056 B1 * | 10/2002 | Tzeng | 206/320 |
| D465,330 S | 11/2002 | Parker | |
| 6,494,321 B1 | 12/2002 | Sadow | |
| D470,659 S | 2/2003 | Story et al. | |
| 6,519,141 B2 | 2/2003 | Tseng et al. | |
| 6,525,928 B1 | 2/2003 | Madsen et al. | |
| 6,536,589 B2 * | 3/2003 | Chang | 206/320 |
| D472,384 S | 4/2003 | Richardson | |
| 6,604,618 B1 | 8/2003 | Godshaw | |
| 6,614,722 B2 | 9/2003 | Polany et al. | |
| 6,617,973 B1 | 9/2003 | Osterman | |
| 6,646,864 B2 * | 11/2003 | Richardson | 361/679.3 |
| 6,659,274 B2 | 12/2003 | Enners | |
| 6,665,174 B1 * | 12/2003 | Derr et al. | 361/681 |
| 6,698,608 B2 | 3/2004 | Parker | |
| 6,772,879 B1 | 8/2004 | Domotor | |
| 6,781,825 B2 | 8/2004 | Shih | |
| 6,871,739 B2 | 3/2005 | Lopez | |
| 6,892,880 B2 | 5/2005 | Nieves | |
| 6,896,134 B2 | 5/2005 | Russell | |
| D513,123 S | 12/2005 | Richardson et al. | |
| D513,451 S | 1/2006 | Richardson et al. | |
| D514,808 S | 2/2006 | Morine et al. | |
| 6,995,976 B2 * | 2/2006 | Richardson | 361/681 |
| D516,309 S | 3/2006 | Richardson et al. | |
| D516,553 S | 3/2006 | Richardson | |
| D516,807 S | 3/2006 | Richardson et al. | |
| D526,780 S | 8/2006 | Richardson et al. | |
| D530,079 S | 10/2006 | Richardson et al. | |
| 7,158,376 B2 | 1/2007 | Richardson et al. | |
| 7,180,735 B2 | 2/2007 | Richardson et al. | |
| D542,524 S | 5/2007 | Richardson et al. | |
| 7,230,823 B2 | 6/2007 | Richardson et al. | |
| D557,264 S | 12/2007 | Richardson et al. | |
| D557,897 S | 12/2007 | Richardson et al. | |
| 7,312,984 B2 | 12/2007 | Richardson et al. | |
| 7,609,512 B2 * | 10/2009 | Richardson et al. | 361/679.41 |
| 2002/0071550 A1 | 6/2002 | Pletikosa | |
| 2002/0085342 A1 | 7/2002 | Chen | |
| 2002/0101707 A1 | 8/2002 | Canova et al. | |
| 2003/0002277 A1 | 1/2003 | Lu | |
| 2003/0006968 A1 | 1/2003 | Solomon | |
| 2003/0032395 A1 | 2/2003 | Huang et al. | |
| 2003/0154414 A1 | 8/2003 | von Mueller et al. | |
| 2003/0217940 A1 | 11/2003 | Russell | |
| 2004/0011616 A1 | 1/2004 | Rasmussen | |
| 2004/0112776 A1 | 6/2004 | Lord | |
| 2004/0120219 A1 | 6/2004 | Polany et al. | |
| 2004/0198416 A1 | 10/2004 | Gardner et al. | |
| 2005/0174727 A1 | 8/2005 | Richardson et al. | |
| 2006/0274493 A1 | 12/2006 | Richardson et al. | |

OTHER PUBLICATIONS

U.S. Appl. No. 60/805,833, filed Jun. 26, 2006.
U.S. Appl. No. 60/807,726, filed Jul. 19, 2006.
U.S. Appl. No. 12/134,120, filed Jun. 5, 2008.
U.S. Appl. No. 11/466,342, filed Aug. 22, 2006.
U.S. Appl. No. 11/456,157, filed Jul. 7, 2006.
U.S. Appl. No. 11/768,761, filed Jun. 26, 2007.
Design U.S. Appl. No. 29/284,532, filed Sep. 10, 2007.
Design U.S. Appl. No. 29/284,641, filed Sep. 12, 2007.
Design U.S. Appl. No. 29/298,588, filed Dec. 7, 2007.
Design U.S. Appl. No. 29/321,167, filed Jul. 11, 2008.
Design U.S. Appl. No. 29/298,580, filed Dec. 7, 2007.
Design U.S. Appl. No. 29/298,581, filed Dec. 7, 2007.
Non-Final Office Action, mailed Mar. 10, 2003, in U.S. Appl. No. 10/300,200, filed Nov. 19, 2002, by Curtis R. Richardson.
Non-Final Office Action, mailed May 6, 2004, in U.S. Appl. No. 10/645,439, filed Aug. 20, 2003, by Curtis R. Richardson.
Non-Final Office Action, mailed Sep. 27, 2004, in U.S. Appl. No. 10/645,439, filed Aug. 20, 2003, by Curtis R. Richardson.
Final Office Action, mailed Jun. 9, 2005, in U.S. Appl. No. 10/645,439, filed Aug. 20, 2003, by Curtis R. Richardson.
Non-Final Office Action, mailed Oct. 19, 2006, in U.S. Appl. No. 11/270,732, filed Nov. 8, 2005, by Curtis R. Richardson.
Non-Final Office Action, mailed Dec. 5, 2008, in U.S. Appl. No. 11/456,157, filed Jul. 7, 2006, by Curtis R. Richardson.
Non-Final Office Action, mailed Jun. 26, 2007, in U.S. Appl. No. 11/676,986, filed Feb. 20, 2007, by Curtis R. Richardson.

* cited by examiner

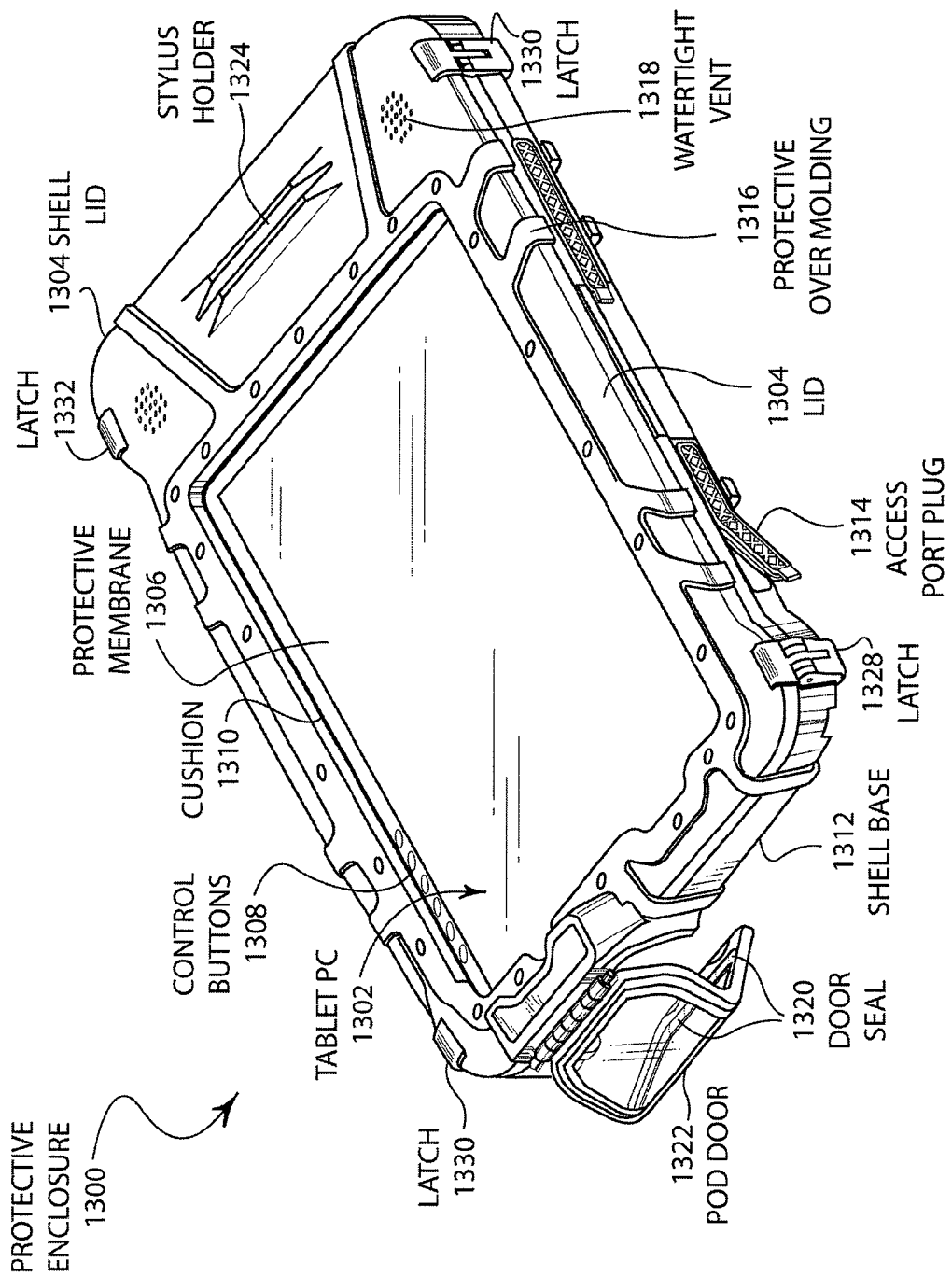

PROTECTIVE ENCLOSURE FOR TOUCH SCREEN DEVICE

CROSS-REFERENCE TO RELATED APPLICATION

This application is a continuation-in-part of U.S. application Ser. No. 11/466,342, filed Aug. 22, 2006, by Curtis R. Richardson, et al., entitled "Protective Enclosure for Personal Digital Assistant Case Having Integrated Back Lighted Keyboard," which application is a continuation-in-part of U.S. continuation application Ser. No. 11/270,732, filed Nov. 8, 2005, by Curtis R. Richardson, et al., entitled, "Protective Case for Touch Screen Device," which is a continuation of U.S. patent application Ser. No. 10/645,439, entitled "Protective Membrane for Touch Screen Device," by Curtis R. Richardson and Douglas A. Kempel, filed Aug. 20, 2003, which claims the benefit of and priority to U.S. Pat. No. 6,646,864 entitled "Protective Case for Touch Screen Device" by Curtis R. Richardson, issued Nov. 11, 2003, which claims the benefit of and priority to U.S. Provisional Patent Application Ser. No. 60/335,865 filed Nov. 19, 2001, by Curtis R. Richardson, entitled "Protective Case for Touch Screen Device," the entire contents of the applications are hereby specifically incorporated herein by reference for all they disclose and teach.

BACKGROUND OF THE INVENTION

Portable electronic devices, such as personal electronic devices, personal data assistants, computers, MP3 players, music players, video players, smart phones, GPS receivers, telematic devices, cell phones, satellite phones, pagers, monitors, walkie-talkies, bar code readers, computers, as well as various hybrid devices that combine two or more of these functions, etc. are being very widely used, and are being deployed in industrial, as well as office environments. Portable electronic devices are being used in industrial environments for data collection, such as service information on an airplane, or for data delivery, such as maps for fire fighters and other emergency personnel. When portable electronic devices are deployed in such industrial applications, the data that is collected and displayed on the portable electronic device can be extremely valuable and can be life saving.

Industrial environments impose harsh conditions that typical portable electronic devices are not designed to accommodate. For example, damage can be done to the portable electronic device through rough handling and dropping. Further, industrial chemicals, grease, water, dirt, and grime may damage or destroy a functioning portable electronic device and inhibit the use of the portable electronic devices valuable data. It is common to hold the portable electronic devices inside a protective case for transport. However portable electronic devices are usually removed for use since most cases used for transport are not interactive.

Interactive cases are also useful for non-industrial applications to provide protection for portable electronic devices. For example, common retail users of portable electronic devices may also desire to have a more rugged case for use in various activities, such as fishing, kayaking, rafting, skiing, etc., where it is easy to damage sensitive portable electronic devices, and interactivity is desired without removing the portable electronic device from the protective case.

SUMMARY OF THE INVENTION

One embodiment of the present invention may therefore comprise a protective enclosure for an electronic device having a touch screen comprising: a shell that is capable of enclosing and substantially surrounding the electronic device, the electronic device being a separate unit from the protective enclosure, the electronic device being insertable in and removable from the protective enclosure by hand, the shell being substantially watertight, substantially rigid and substantially crush-resistant; a protective membrane attached to the shell so that the protective membrane is disposed over the touch screen of the electronic device when the electronic device is enclosed in the shell, the protective membrane being sufficiently thin to allow tactile inputs on a front side of the protective membrane to be communicated to the touch screen through the protective membrane, the protective membrane being transparent such that the touch screen is visible through the protective membrane so that the touch screen is capable of displaying information through the flexible protective membrane.

Another embodiment of the present invention may therefore further comprise a method of manufacturing a protective enclosure for an electronic device having a touch screen comprising: providing a protective shell that is capable of enclosing the electronic device, the electronic device being a separate unit from the protective shell, the electronic device being insertable in, and removeable from the protective shell by hand, the protective shell having an aperture aligned with the touch screen when the electronic device is disposed in the protective shell; attaching a protective membrane to a surface of the shell over the aperture, the protective membrane being attached to the shell to provide a substantially watertight enclosure and disposed in alignment with the touch screen of the electronic device when the electronic device is enclosed in the protective enclosure, the protective membrane being recessed from an outer surface of the shell to prevent damage to the touch screen, the protective membrane being sufficiently thin to allow interaction with the touch screen.

BRIEF DESCRIPTION OF THE DRAWINGS

FIG. 13A is a perspective top view of another embodiment of a protective enclosure for a tablet PC.

DETAILED DESCRIPTION OF THE INVENTION

Figure 1:
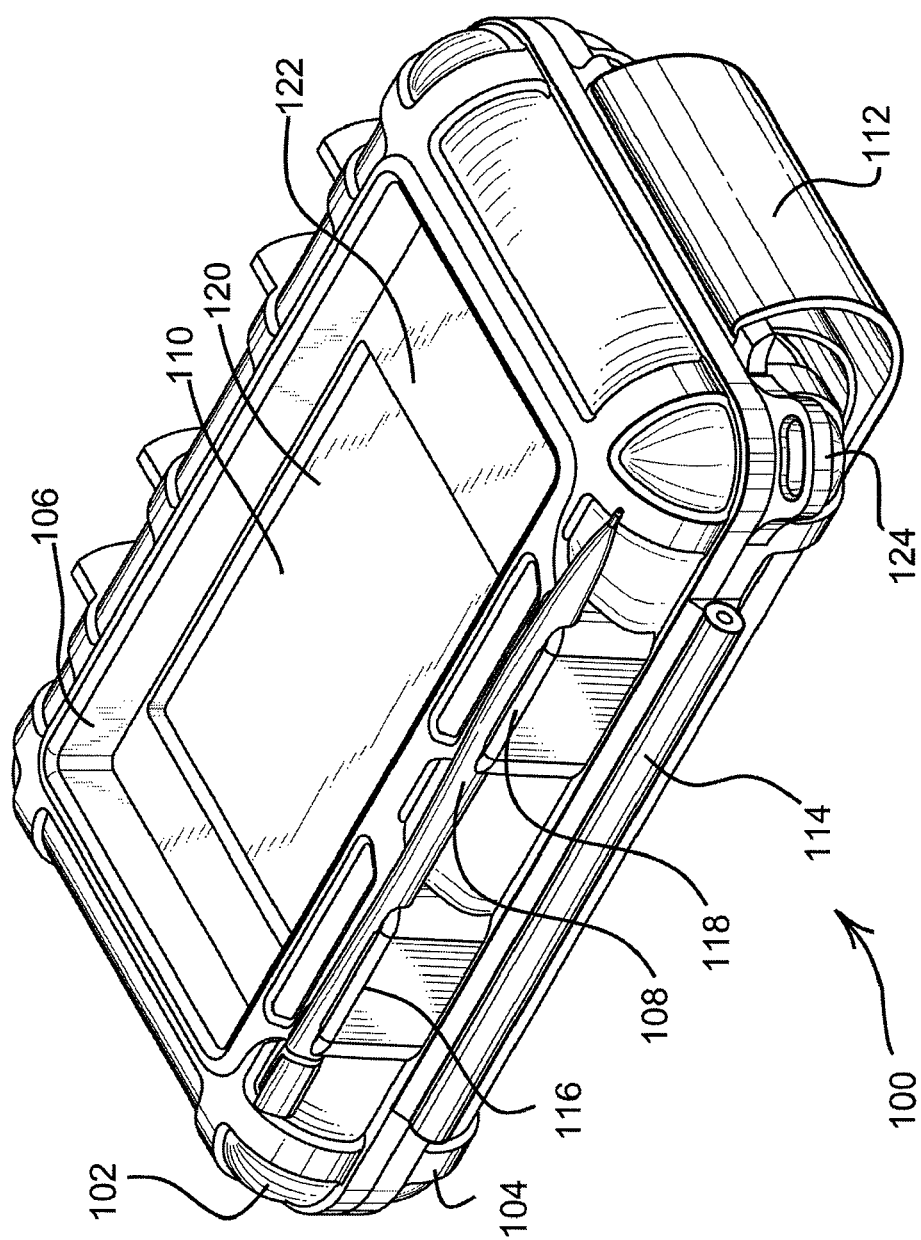
FIG. 1 is a perspective view of one embodiment shown in a closed position.

FIG. 1 is a perspective view of one embodiment of a protective case 100 for a personal electronic device. Protective case 100 comprises a rigidly molded front shell 102 and rear shell 104. An overmolded grommet 106 forms a receptacle for stylus 108 and also aids in sealing membrane 110. A flexible hand strap 112 attaches to the rear case 104. A hinge 114 joins front case 102 and rear case 104. A ring 124 for a lanyard is shown as an integral feature of rear case 104.

Protective case 100 is designed to hold a personal electronic device, such as a personal data assistant, a computer, including laptops, handheld and ultramobile computers and tablet computers, MP3 players, music players, video players, smart phones, GPS navigational devices, telematics devices, cell phones, satellite phones, pagers, monitors, walkie-talkies, bar code scanners, etc. that are used for a wide variety of purposes. As used herein, the term "personal electronic device" can include anyone of these devices, or similar devices. A personal electronic device, such as a Palm Pilot, Handspring Visor, Compaq Ipaq, Hewlett Packard Jornada, iPod®, iPhone®, and similar products use a touch screen for display and data entry. The touch screen display comprises either a color or black and white liquid crystal display with a touch sensitive device for activating the device. The display is used for displaying graphics, text, and other information to the user. The touch screen can be used with a stylus 108 to select elements from the screen, to draw figures, and to enter text with a character recognition program in the personal electronic device. The stylus 108 generally resembles a conventional writing implement. However, the tip of the writing implement is a rounded plastic tip. In place of a stylus 108, the user may use the tip of a finger or fingernail, or a conventional pen or pencil. When a conventional writing implement is used, damage to the touch screen element may occur, such as from scratches.

In addition, the personal electronic devices may have several additional buttons as part of the user interface. The additional buttons may be used as shortcut buttons to instantly call up a certain program on the personal electronic device, may comprise a method of scrolling, may be used to select items from a list, or may have any function that the designer of the personal electronic device software may assign to a button or set of buttons. The button size, layout, and function may vary for each manufacturer and model of personal electronic device.

Further, personal electronic devices typically have at least one method of connecting to another computer. This may be through a direct electrical connection, such as through a wire cable or fiber optic, through another medium such as infrared communication, or through a radio communication.

Additionally, the personal electronic devices typically have an electrical source. The electrical source may be a rechargeable or non-rechargeable battery or solar cells. The electrical source may be a remote source of electricity that is transmitted to the personal electronic device through a wire cable or through other methods of electrical transmission. For solar charged personal electronic devices, a separate window may be required, or an existing window in the protective cover can be used to transmit solar energy to the personal electronic device.

Further, personal electronic devices may have indicator lights, such as status lights for power, communication, battery status, or other functions. The lights may be located on any of the sides or tops of the personal electronic device and may be viewable on one or more sides.

Front shell 102 and rear shell 104 form a protective cover for the personal electronic device. The protective cover may be designed for rugged industrial use, recreational use, commercial use, or many other uses. An industrial use may require the protective cover to be watertight, chemically resistant, protect the unit when dropped, and be crush proof. A typical industrial application may be the use by firefighters for a display of maps for directions to an emergency scene or for a building plan at the scene of a fire. Another example may be the use of a personal electronic device by a maintenance mechanic in a chemical plant to record maintenance records in the plant. A recreational use may require the personal electronic device to be watertight, afford some protection against dropping and being crushed, float in water, and be dust resistant. A recreational use may include using the personal electronic device during kayaking, diving, or other water sport activity. Further, the protective case may be used when the personal electronic device is taken camping, hiking, or other outdoor activity. A commercial use may additionally require the protective cover to be elegant, but may also require the cover to be replaceable so that scratches and other signs of wear and tear can be easily and cheaply replaced. Hence, the protective cases disclosed herein may have either integrally formed display windows or replaceable windows.

The protective case for the personal electronic device may take on many embodiments. The protective case 100 comprises a front cover 102 and rear cover 104 that are joined by a hinge 114 and a clasp mechanism that is on the side of the covers opposite the hinge 114. Other embodiments may have a small door into which the personal electronic device slides, or the protective case may not completely enclose the personal electronic device and only cover the face where the user interface exists, leaving one or more sides of the personal electronic device exposed. Those skilled in the art may use other designs of protective cases without deviating from the scope and intent of the present invention.

The protective case 100 may be constructed of rigid plastic, metal, flexible rubber, or any other type of material that could be adapted to afford the protection of the personal electronic device desired for the application. A flexible rubber cover may be selected for an application in a wet environment. A rigid plastic case may be selected for an application where dropping the personal electronic device is a concern. Those skilled in the art may use other types of materials and constructions without deviating from the spirit of the present invention.

The personal electronic device may be mounted in the protective case 100 using many different mounting techniques. For example, the personal electronic device may be mounted using open or closed cell foam inserts in the protective cover. In another embodiment, the personal electronic device may be mounted by attaching the personal electronic device to the case with a fastener. In another embodiment, the personal electronic device may be mounted by snapping into the protective waterproof cover. In another embodiment, the personal electronic device may be held in place by resting in molded features of two halves of a protective case that clamps onto the personal electronic device. Those skilled in the art may use other types of locating and holding mechanisms without deviating from the spirit of the present invention.

The overmolded grommet 106 of the present embodiment is constructed by injection molding a thermoplastic polymerized rubber (TPR) over the front case 102. The grommet 106 has molded features 116 and 118 adapted to retain the stylus 108. Features 116 and 118 capture the stylus 108 during transportation, but allow the user to remove the stylus 108 to operate the personal electronic device. In other embodiments of the present invention, the stylus 108 may be constrained to the personal electronic device with a tether or lanyard, or the constraining features may be incorporated into other components that make up the protective cover. Further, the stylus 108 may not be present in the embodiment, rather that the personal electronic device be adapted to be used with the user's fingernail or with another implement similar to the stylus 108.

The membrane 110 of the present embodiment is constructed by thermoforming a sheet of thin plastic. The plastic is selected to be thin enough that the deformation of a stylus conducts the touch to the touch screen, but thick enough to have enough rigidity that the stylus does not catch and rip the membrane. Additionally, the membrane 110 should have enough thickness to endure scratches and other wear and tear without breaking and sacrificing the protective function. Polyvinylchoride material of approximately 0.008 in to 0.015 in thickness gives acceptable results. Alternatively, membrane 110 may be constructed by injection molding or other methods. Alternative materials may be used by those skilled in the art to achieve the same results while maintaining within the spirit and intent of the present invention.

The membrane 110 in the present embodiment may be transparent or at least partially transparent, so that the images displayed on the personal electronic device may be visible through the membrane 110. The membrane 110 may be tinted or colorized in some applications. For example, a protective cover designed as a decorative cover may incorporate a colorized membrane 110. Further, the membrane may be selectively colorized and the opaqueness may vary. For example, the protective membrane may be printed or painted in the areas not used for the touch screen. A printing process may incorporate a logo, graphics, or labeling for individual buttons for the personal electronic device. The printing process may further incorporate features, such as text or graphics, that are used by the software on the personal electronic device for a purpose such as simplifying data input or for designating an area on the touch screen for a specific function, such as a help function. The printing or painting processes used on the membrane 110 may be purely decorative and may be for aesthetic purposes only. The printing process may also comprise logos or graphics for the brand identity of the personal electronic device cover. Other processes, such as colorizing the raw material for the membrane 110 or adding other components to the raw material, such as metal flakes or other additives, may be used to change the optical features of the membrane 110.

The optical performance of the membrane 110 may be changed or enhanced by changing the texture of the area of the touch screen. For example, the membrane may be frosted on the outside to hide scratches or may be imprinted with a lens or other features that change the optical characteristics of the membrane 110. The membrane 110 may have optical features that are used in conjunction with the software of the personal electronic device. For example, all or a portion of the membrane may comprise a lens that magnifies an image to a user. When the user touches the image on the membrane 110 and the touch is transferred to the touch screen, the software in the personal electronic device may have to compensate for the positional differences between the image and actual area that was touched by the user. In another example, if a specific portion of the membrane 110 has a specific optical characteristic, the software of the personal electronic device may be constructed to display a specific graphic for the area for an intended effect.

The membrane 110 in the present embodiment has a recessed portion 120 and a raised portion 122. The recessed portion 120 may be adapted to press flat against the touch screen area of a specific personal electronic device. The raised portion 122 may be adapted to fit over an area of the specific personal electronic device where several buttons are located.

The raised portion 122 allows the user to operate the buttons on the personal electronic device. The raised portion 122 is adapted such that the buttons on the personal electronic device are easily operated through the protective membrane 110. The raised portion 122 may have special features to aid the user in pressing the buttons. For example, the raised portion 122 may comprise a dimpled area for the user's finger located directly over the button. Further, a feature to aid the user may comprise a section of membrane 110 defined by a thinner area around the section, enabling the user to more easily deflect the section of membrane over the button. The area of thinner material may comprise a large section or a thin line. Further, tactile elements, such as small ribs or bumps may be incorporated into the membrane 110 in the area of the buttons so that the user has a tactile sensation that the user's finger is over the button. The tactile element may be particularly effective if the button was a power switch, for example, that turned on the personal electronic device.

The configuration of the membrane 110 may be unique to each style or model of personal electronic device, however, the front case 102 and rear case 104 may be used over a variety of personal electronic devices. In the present embodiment, the changeover from one personal electronic device variety to another is accomplished by replacing the membrane 110 without having to change any other parts. The present embodiment may therefore be mass-produced with the only customizable area being the membrane 110 to allow different models of personal electronic devices to be used with a certain front case 102 and rear case 104.

The hand strap 112 in the present embodiment allows the user to hold the embodiment 100 securely in his hand while using the personal electronic device. The hand strap 112 may be constructed of a flexible material, such as rubber or cloth webbing, and may have an adjustment, such as a buckle, hook and loop fastener, or other method of adjustment. In other embodiments, a hand strap may be a rigid plastic handle, a folding handle, or any other method of assisting the user in holding the embodiment. Further, the embodiment may be adapted to be fix-mounted to another object, like a piece of machinery, a wall, or any other object. A fix-mounted embodiment may have other accoutrements adapted for a fixed mount applications, such as receptacles for a stylus adapted to a fix-mount, specialized electrical connections, features for locking the personal electronic device inside the case to prevent theft, or designs specifically adapted to shed water when rained upon.

Figure 2:
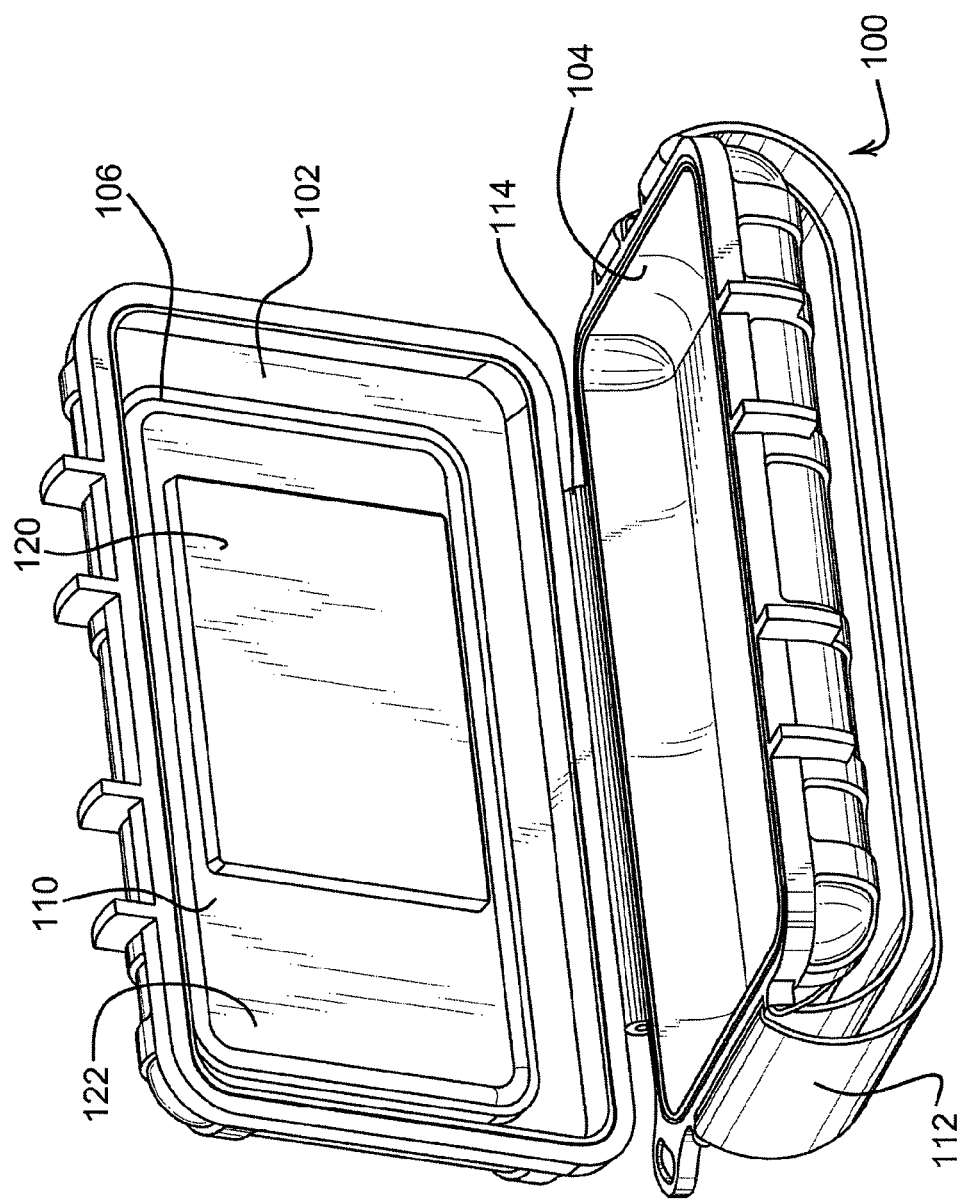
FIG. 2 is a perspective view of the embodiment of FIG. 1 shown in an open position.

FIG. 2 illustrates a perspective view of the embodiment 100 shown in an open position. The front cover 102 and rear cover 104 are shown open about the hinge 114. Membrane 110 is shown installed into gasket 106, and the recessed portion 120 and raised portion 122 of membrane 110 is illustrated looking from the inside of the case. The clasp mechanisms are not shown in this illustration. Hand strap 112 is shown attached to rear case 104.

Figure 3:
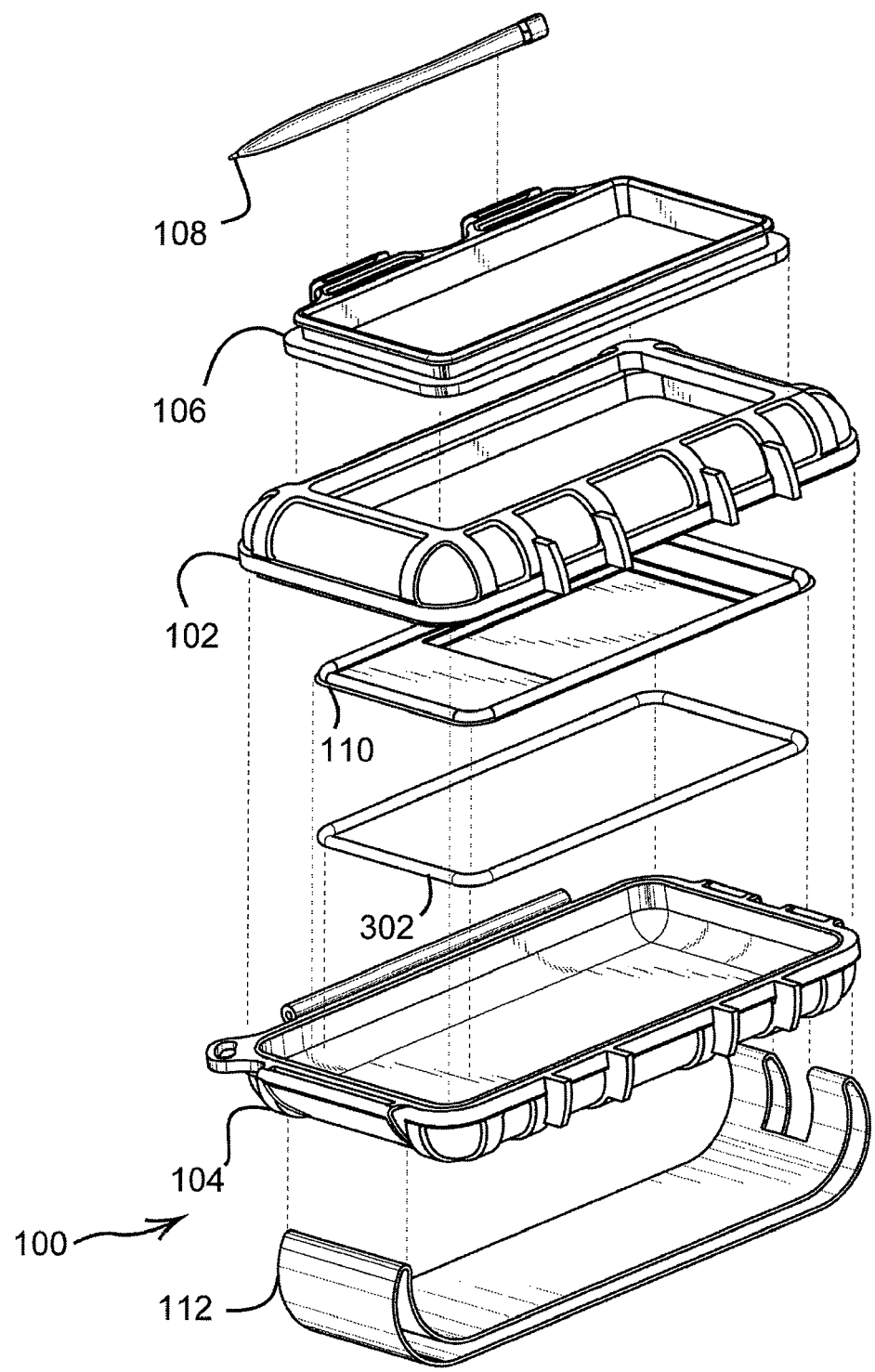
FIG. 3 is a perspective view of the embodiment of FIG. 1 shown in an exploded state.

FIG. 3 illustrates a perspective view of the embodiment 100 shown in an exploded state. The hand strap 112 attaches to the rear cover 104. The overmolded grommet 106 holds the stylus 108 and is attached to front cover 102. The membrane 110 attaches to the grommet 106 and is held in place with an o-ring 302.

Figure 4:
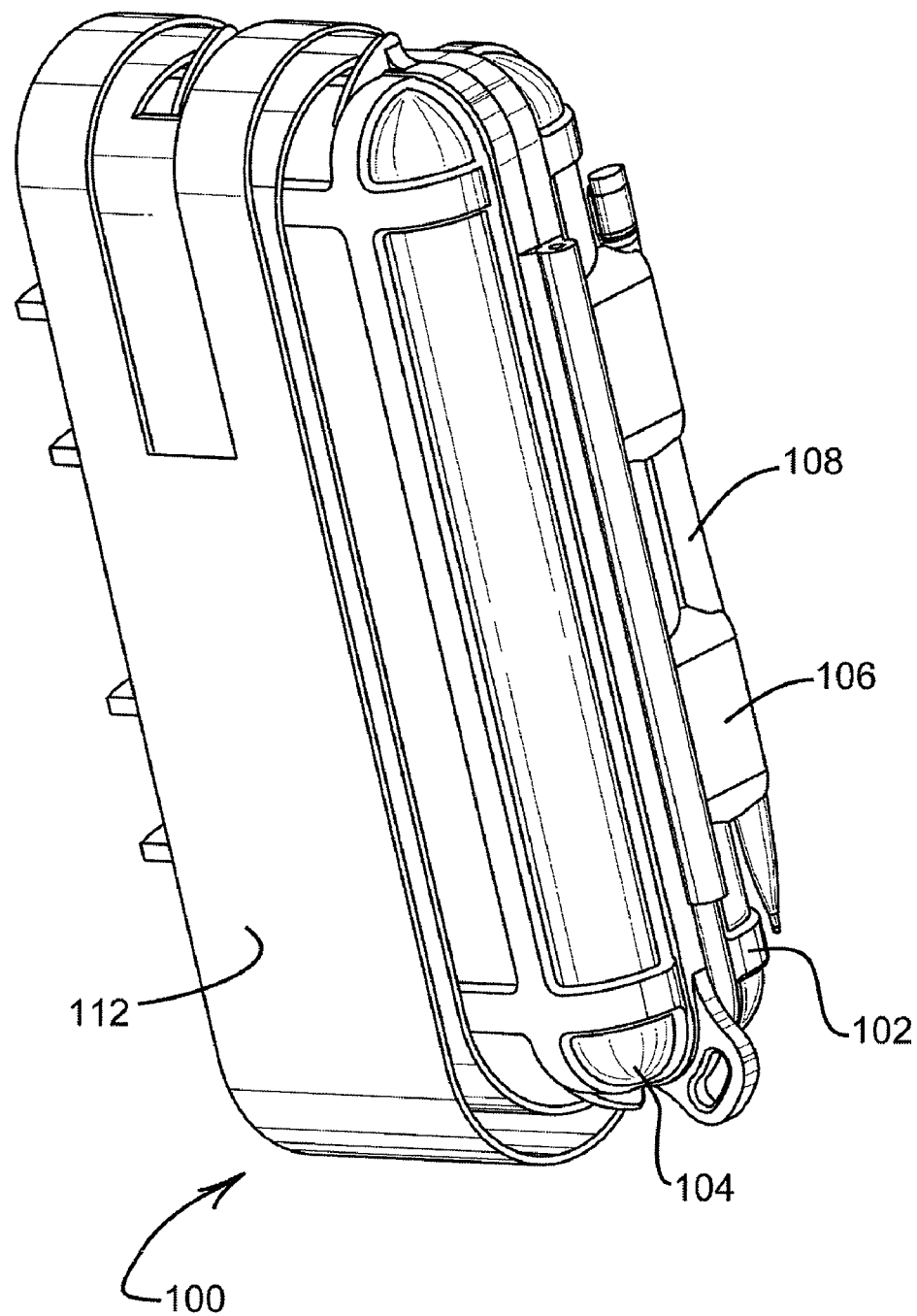
FIG. 4 is a perspective view of the embodiment of FIG. 1 shown from the rear.

FIG. 4 illustrates a perspective view of the embodiment 100 shown from the rear. The hand strap 112 is shown, along with rear cover 104 and front cover 102. The stylus 108 is shown inserted into the overmolded grommet 106.

Figure 5:
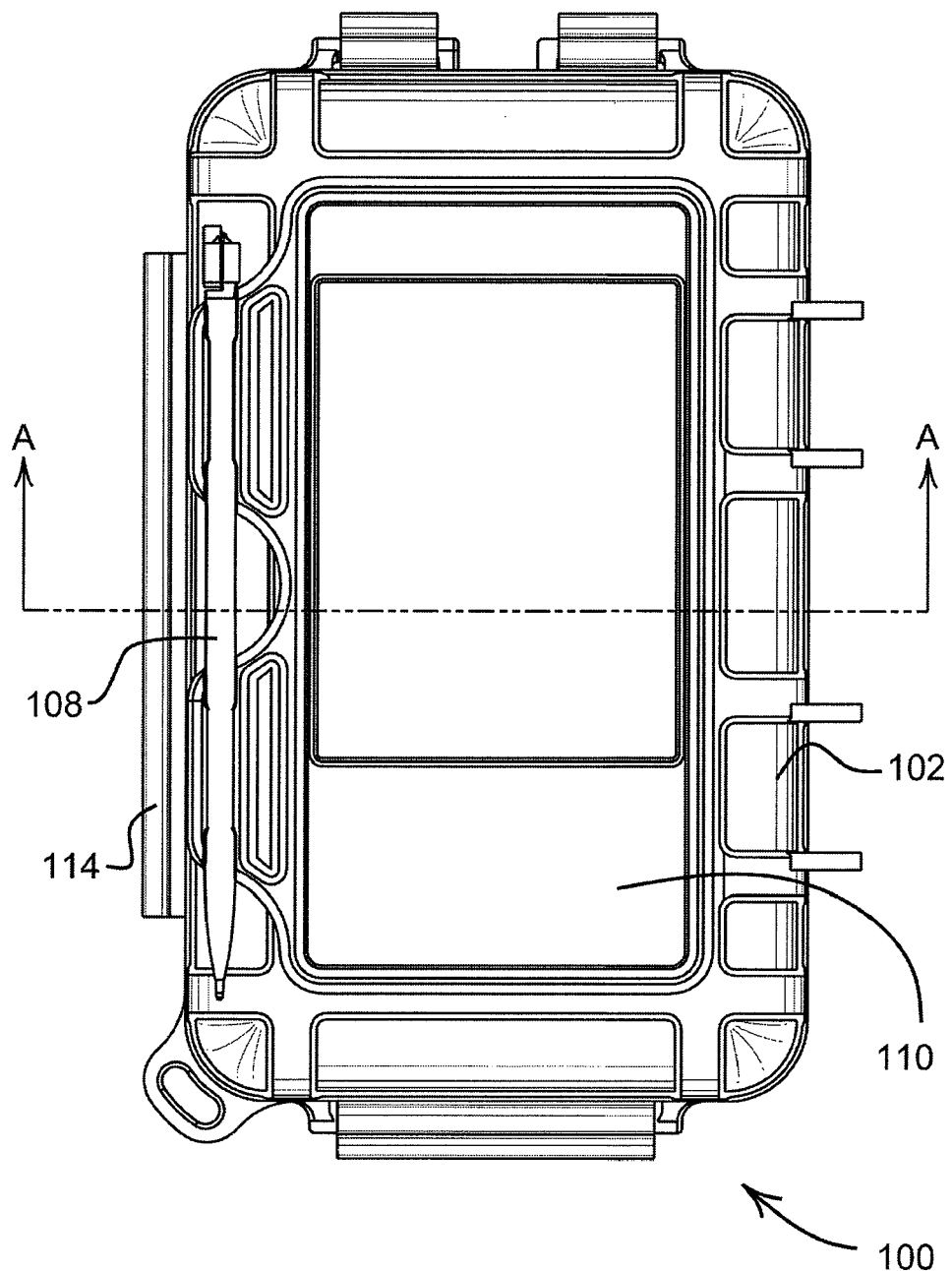
FIG. 5 is a front view of the embodiment of FIG. 1 showing a section line.

FIG. 5 illustrates a top view of the embodiment 100. The front cover 102, membrane 110, stylus 108, and hinge 114 are all visible.

Figure 6:
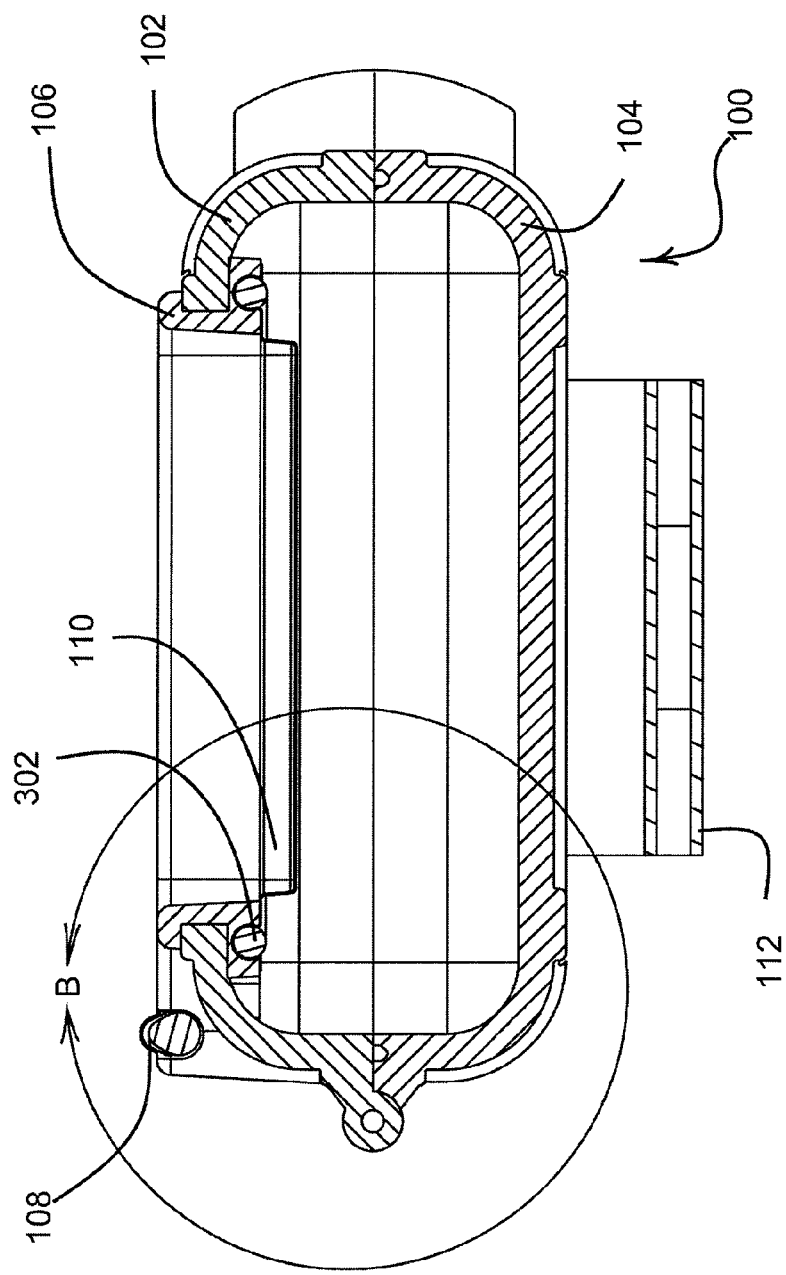
FIG. 6 is a section view of the embodiment of FIG. 5.

FIG. 6 illustrates a section view of the embodiment 100 taken through the section line shown in FIG. 5. The front cover 102, rear cover 104, overmolded gasket 106, stylus 108, membrane 110, hand strap 112, and o-ring 302 are all shown hatched in this view.

Figure 7:
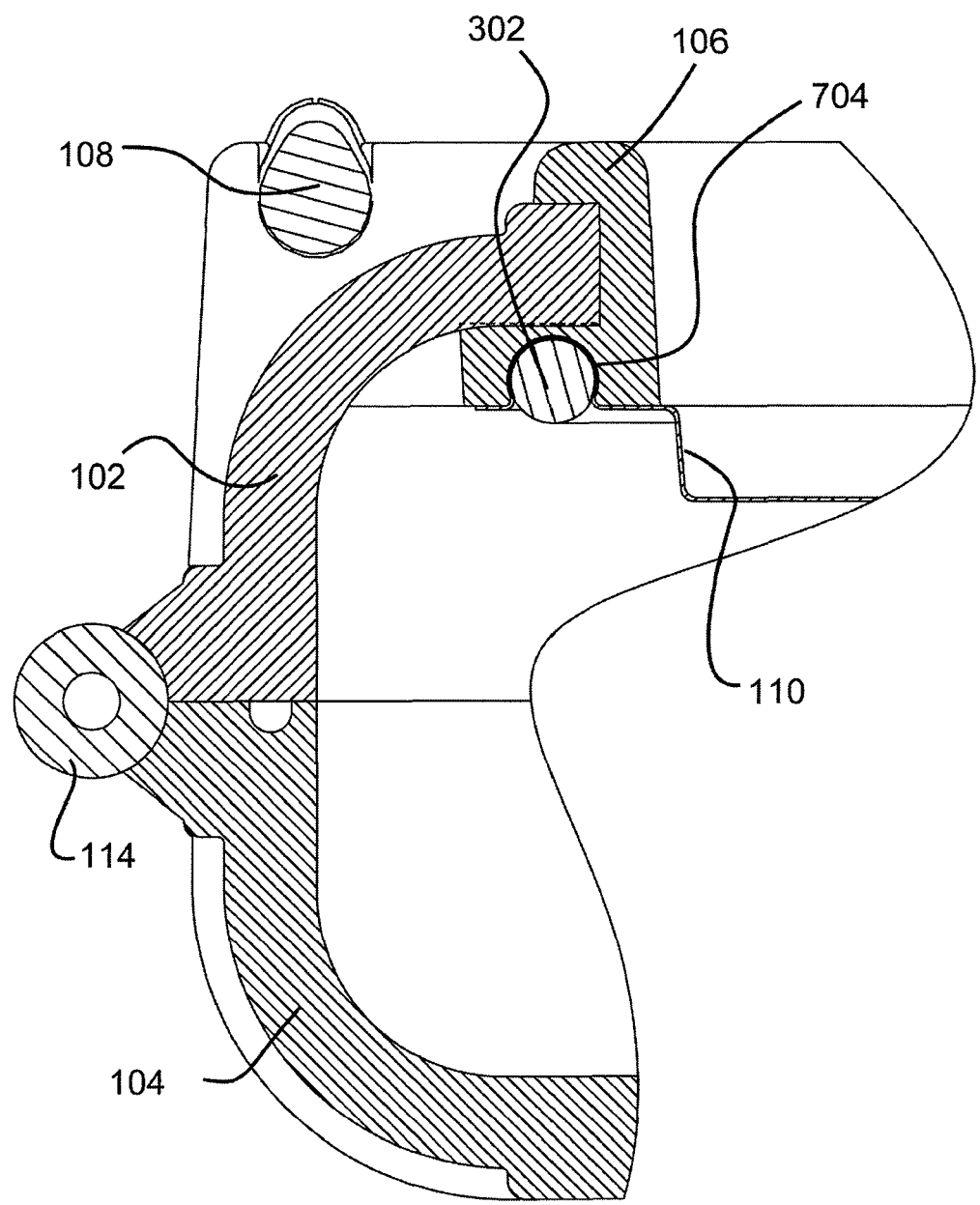
FIG. 7 is a detailed view of a section shown in FIG. 6.

FIG. 7 illustrates a detail view of Section B of the embodiment 100 shown in FIG. 6. Front case 102 and rear case 104 are joined at hinge 114. Overmolded gasket 106 traps membrane 110 and o-ring 302 locks membrane 110 in place. Overmolded gasket 106 may be formed by molding thermoplastic polymerized rubber over the front cover 102.

The replacement of the membrane 110 is accomplished by removing o-ring 302, pushing the membrane 110 from the overmolded gasket 106, snapping a new membrane 110 into place, and replacing the o-ring 302. The ease of replacement of the present embodiment allows a user to quickly replace a damaged membrane 110, allows a user to upgrade their case to a newer model personal electronic device, and may allow a user to select from various membranes 110 for the particular application. One embodiment may have a single case packaged with a small variety of several types of membranes 110. In such an embodiment, the user may purchase the packaged set, select the membrane 110 that suits the user's particular personal electronic device, and install the selected membrane 110 with ease.

The protective case illustrated in the various embodiments disclosed herein may also include pass-through connections for transmission of power, communications data, heat dissipation, optical transmissions, and mechanical motion, both to and from the personal electronic device.

Electrical connections may require an insulated conductor from the personal electronic device through the wall of the protective cover so that a flexible cable may be attached, or so that the personal electronic device in the protective case may be placed in a cradle which provides the proper electrical connections. Inside the protective cover, the electrical connections may be made with a flexible cable that is plugged into the personal electronic devices electrical connector before the personal electronic device is secured in the protective cover. Alternatively, a fixed connector may be attached to the protective cover and the personal electronic device is slid into contact with the fixed connector. Another embodiment may include a compliant, yet fixed mounted electrical connector to be rigidly mounted inside the protective cover, such as disclosed in U.S. application Ser. No. 11/676,986, filed Feb. 20, 2007, and U.S. Pat. No. 7,180,735, issued Feb. 20, 2007, which are specifically incorporated herein for all that they disclose and teach. A compliant, yet fixed mounted electrical connector may comprise spring loaded probes, commonly referred to as pogo pins. Another embodiment may comprise spring fingers that engage the personal electronic devices electrical contacts. On the outside of the protective cover, the electrical contacts may be terminated into a fix-mounted connector adapted to receive a cable from a computer. The connector may be designed to receive a cable that plugs directly into the personal electronic device or it may be adapted to receive a different connector. Further, the electrical connection to the personal electronic device may be permanently attached to a cable that extends out of the protective cover. Another embodiment may include a small trap door in the protective cover that allows access to the electrical connections. While the trap door exposes the personal electronic device to the elements the cover is designed to protect against, a direct electrical connection may eliminate a potential cabling connection problem. Connections for fiber optics can be handled in similar fashions as the electrical connections.

An embodiment with a power connection may comprise the use of inductive coils located in proximity to each other but on opposite sides of the protective cover. Those skilled in the art of may devise other embodiments for connecting through the protective cover without deviating from the scope and intent of the present invention.

Through the air communications, such as infrared and over the air radio frequency (RF) communications may pass through the protective cover. The material for the front case 102 and rear case 104 may be selected to be clear plastic, such as polycarbonate. The infrared transceiver of the personal electronic device can communicate through a clear plastic case to another infrared transceiver outside of the case. Further, the appropriate selection of material for the protective case can thereby enable various RF transmissions, such as cellular phone communications or other wireless communication protocols.

An infrared transmission through the protective case of an embodiment of the invention may be accomplished by making the entire protective case out of a clear material. Alternatively, a selected area of the protective case may be clear while the remainder of the case is opaque. The selected area may be constructed of a separate piece that allows the infrared light through the protective case. Alternatively, the selected area may be constructed of a portion of the protective case that manufactured in a way so as not to be opaque, such as selectively not painting or plating the area of a plastic protective case. Further, the clear material through which the transmission occurs may be tinted in the visual spectrum but be transparent or at least partially transparent in the infrared spectrum of the device.

A protective case may allow RF transmissions to and from the personal electronic device while the case is closed. Such a case may be constructed of a non-metallic material. In some embodiments, the material of the protective case may be tuned to allow certain frequencies to pass through the protective cover and tune out other frequencies, through loading the material used in the protective cover with conductive media or through varying the thickness of the case and other geometries of the case in the area of the personal electronic device transmission and reception antenna.

In a different embodiment, it may be desirable to shield the personal electronic device from outside RF interference. In this case, the protective cover may be a metallic construction or may be plastic with a metallized coating. Further, membrane 110 may have a light metallized coating applied so that membrane 110 is slightly or fully conductive. An application for such an embodiment may be the use of the personal electronic device in an area of high RF noise that may interfere with the operation of the personal electronic device, or conversely, the use may be in an area that is highly susceptible to external RF interference and the personal electronic devices RF noise may be interfering with some other device.

The personal electronic device may be equipped with a camera or other video capture device. A protective cover may have provisions to allow a clear image to be seen by the video capture device through the case. Such provisions may include an optically clear insert assembled into the protective case. Other embodiments may have a sliding trap door whereby the user of the personal electronic device may slide the door open for the camera to see. Additionally, other embodiments may comprise a molded case that has an optically clear lens integrally molded. Such an embodiment may be additionally painted, plated, or overmolded, with the lens area masked so that the painting, plating, or overmolding does not interfere with the optics of the lens. Hard coating and scratch resistant features can be added.

An optically clear area may be used for a barcode scanner portion of a personal electronic device to scan through the case to the outside world. In such an embodiment, a barcode scanner may be protected from the elements while still maintaining full functionality in the outside world.

The personal electronic device may have indicator lights that indicate various items, such as power, battery condition, communication, and other status items. The indicator lights may be in positions on the personal electronic device that are not readily viewable through the protective membrane 110. The indicator lights may be made visible through the protective case by using light pipes that transmit the light from the personal electronic devices status light to the outside of the protective case. Such light pipes may be constructed of clear or tinted plastic, or other transparent or semi-transparent material. The light pipes may be formed as an integral feature to the protective case or may be separate parts that are formed separately and assembled to the protective case.

The personal electronic device may have a speaker or other element that makes noise and/or the personal electronic device may have a microphone for receiving audio signals. The speaker may be an audio quality device for reproducing sound or it may be a simple buzzer for indicating various functions of the personal electronic device. The microphone may be an audio quality device or it may be a low performance device. Special provisions may be made for transmitting sound through a protective case. Such provisions may range from a single hole in the case to a tuned cavity that would allow sound to pass through with minimum distortion. Other embodiments may include a transmissive waterproof membrane adapted to allow sound to pass through the protective case with a minimum of distortion. Such membranes may be located near the speaker and microphone elements of the personal electronic device. Such membranes may be watertight membranes known by the brand name Gore-Tex.

The personal electronic device may generate heat during its use and provisions for dissipating the heat may be built into the protective cover. A heat-dissipating device may be integral to the protective cover or may comprise one or more separate parts. For example, a metallic protective cover may be adapted to touch the personal electronic device in the area of heat generation and conduct the heat outwardly to the rest of the protective cover. The protective cover may thereby dissipate the heat to the external air without overheating the personal electronic device. In another example, a separate heat sink may be applied to the personal electronic device and allowed to protrude through a hole in the protective cover. The heat sink may thereby transfer the heat from the personal electronic device to the ambient environment without overheating the personal electronic device. The heat sinks may be attached to the personal electronic device with a thermally conductive adhesive. Other embodiments may include waterproof vent holes for heat dissipation and air circulation that use a transmissive waterproof membrane. Active fans can also be used to reduce heat.

The personal electronic device may have a button that may not be located underneath the membrane 110. An embodiment may include a flexible, pliable, or otherwise movable mechanism that may transmit mechanical motion from the outside of the case to a button on the personal electronic device. Such an embodiment may have a molded dimpled surface that is pliable and allows a user to activate a button on a personal electronic device by pressing the dimpled surface. Another embodiment may have a rigid plunger that is mounted on a spring and adapted to transmit the mechanical movement from the exterior of the case to a button on the personal electronic device. The buttons on the personal electronic device may be located on any side of the personal electronic device and an embodiment of a case may have pliable areas adapted to allow the user to press buttons that are not on the front face of the personal electronic device.

Figure 8:
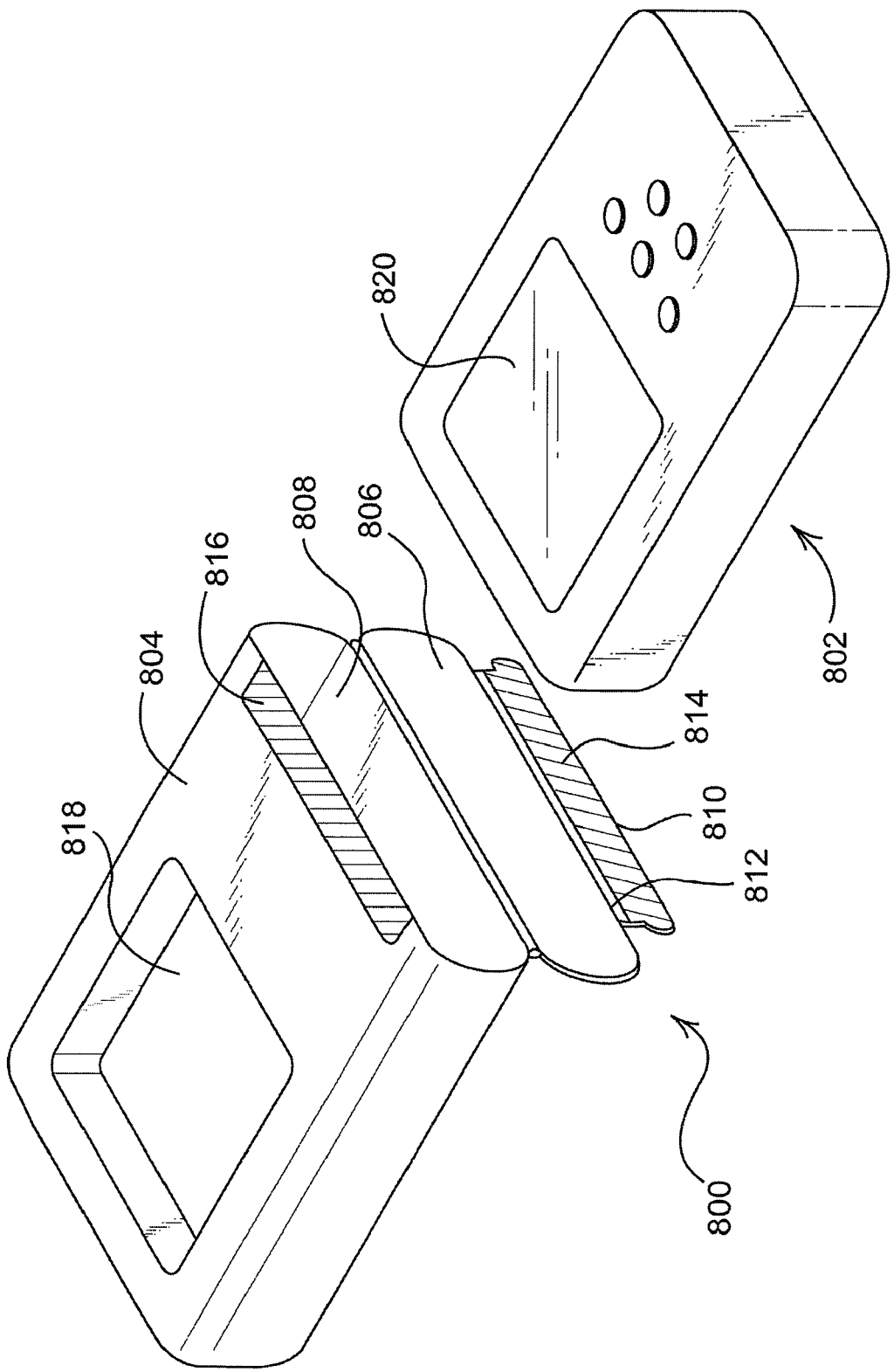
FIG. 8 is a perspective view of another embodiment comprising a single piece encapsulating cover.

FIG. 8 is an illustration of embodiment 800 of the present invention wherein the personal electronic device 802 is encapsulated by a protective cover 804. The installation of the personal electronic device 802 is accomplished by sliding personal electronic device 802 into the opening 808, then folding door 806 closed and securing flap 810, which is hinged along line 812. Areas 814 and 816 may comprise a hook and loop fastener system or other fastening device. Recessed area 818 is adapted to fit against touch screen 820 of personal electronic device 802.

Embodiment 800 may be comprised of a single molded plastic part that may be very low cost. As shown, embodiment 800 may not be completely weathertight, since the door 806 does not completely seal the enclosure. However, such an embodiment may afford considerable protection to the personal electronic device 802 in the areas of dust protection, scratch protection, and being occasionally rained upon. Further, the low cost of the embodiment 800 may be changed often during the life of the personal electronic device 802.

Embodiment 800 may have custom colors, logos, or designs that allow a user to personalize their personal electronic device with a specific cover that is suited to their mood or tastes. The colors, logos, and designs may be integrally molded into the cover 804. Alternatively, different colors, logos, and designs may be applied in a secondary operation such as printing, painting, plating, or other application process.

Figure 9:
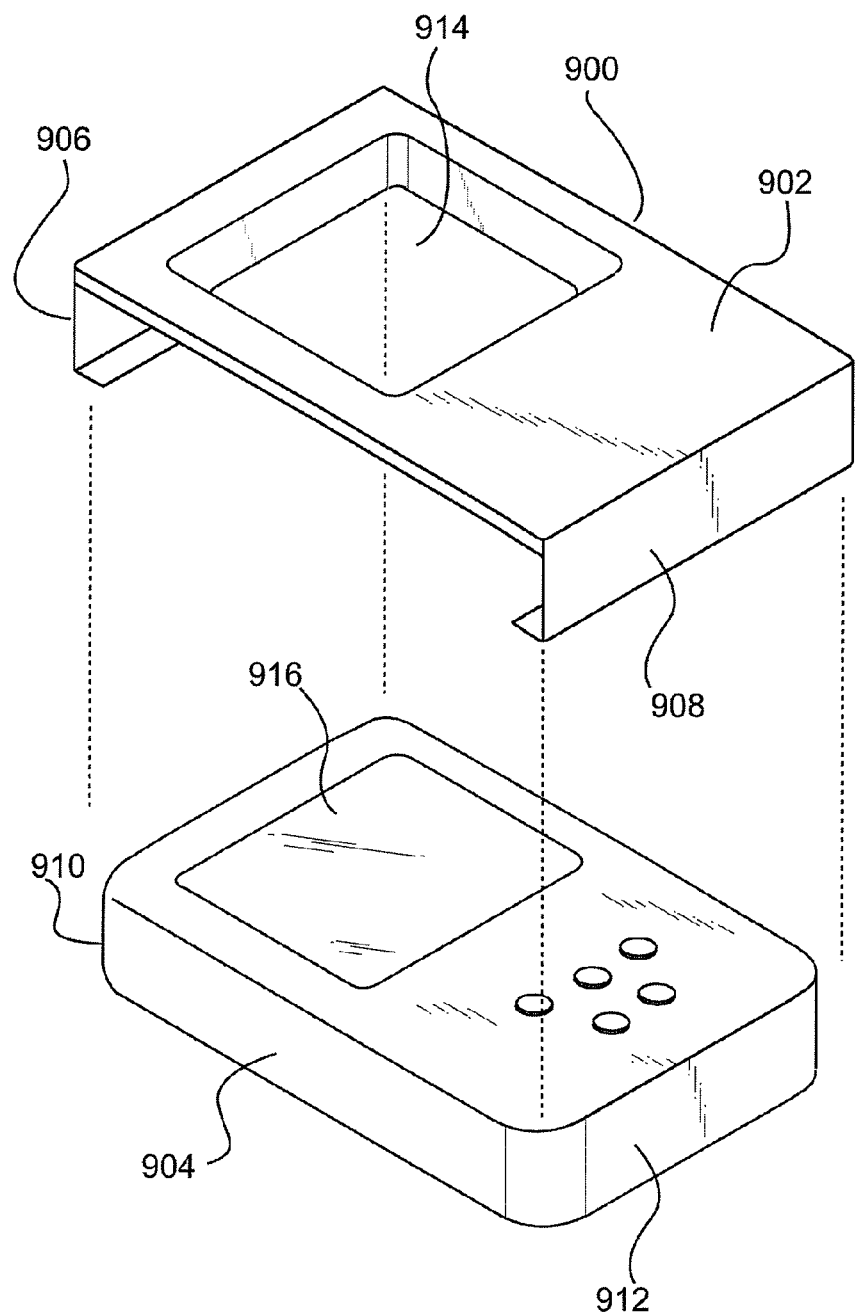
FIG. 9 is a perspective view of another embodiment comprising a non-encapsulating snap over cover.

FIG. 9 is an illustration of another embodiment of a protective cover 900 wherein a decorative cover 902 is snapped over a personal electronic device 904. The ends 906 and 908 snap over the personal electronic device ends 910 and 912 as an attachment mechanism for cover 902 to personal electronic device 904. Recessed area 914 is adapted to fit against touch screen 916.

Protective cover 900 may be a cover for decorative purposes only, or may be for protective purposes as well. Cover 902 may be displayed brilliantly with logos, designs, or other visual embellishments to personalize the personal electronic device 904. The colors, logos, and designs may be integrally molded into the cover 904. Alternatively, different colors, logos, and designs may be applied in a secondary operation such as printing, painting, plating, or other application process.

Protective cover 900 may be attached by snapping the cover 902 onto personal electronic device 904. Special provisions in the case of personal electronic device 904 may be provided for a snapping feature of cover 902, or cover 902 may be adapted to hold onto personal electronic device 904 without the use of special features in personal electronic device 904.

The features used to secure cover 902 to personal electronic device 904 may be any mechanism whereby the cover 902 can be secured. This includes snapping, clamping, fastening, sliding, gluing, adhering, or any other method for securing two components together.

Figure 10:
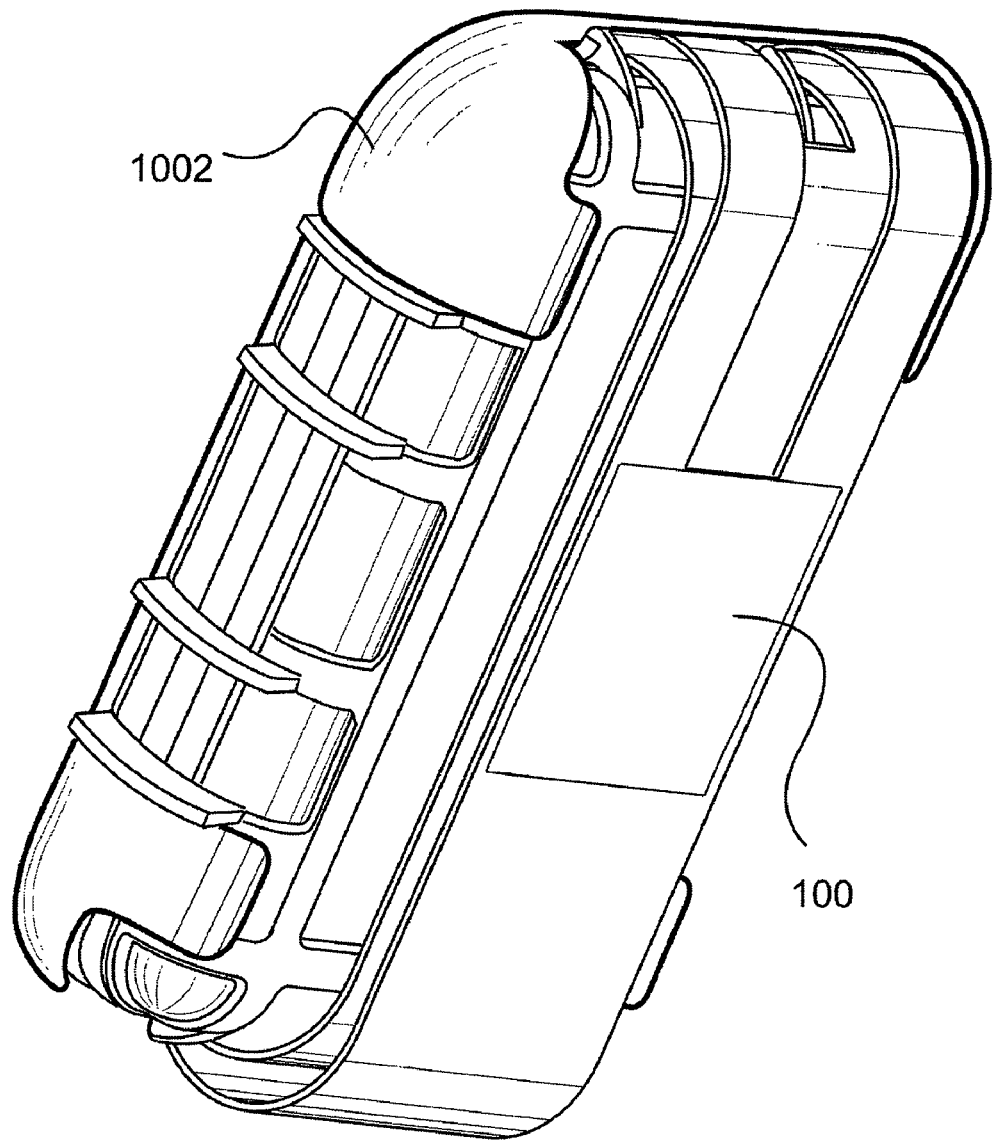
FIG. 10 is a perspective view of another embodiment that comprises a belt clip.

FIG. 10 illustrates a perspective view of an embodiment of a receiver 1002 for holding the protective case 100. The protective case 100 is held by receiver 1002 in such a manner that the touch screen display is facing into the receiver 1002 to afford protection to the touch screen display.

Figure 11:
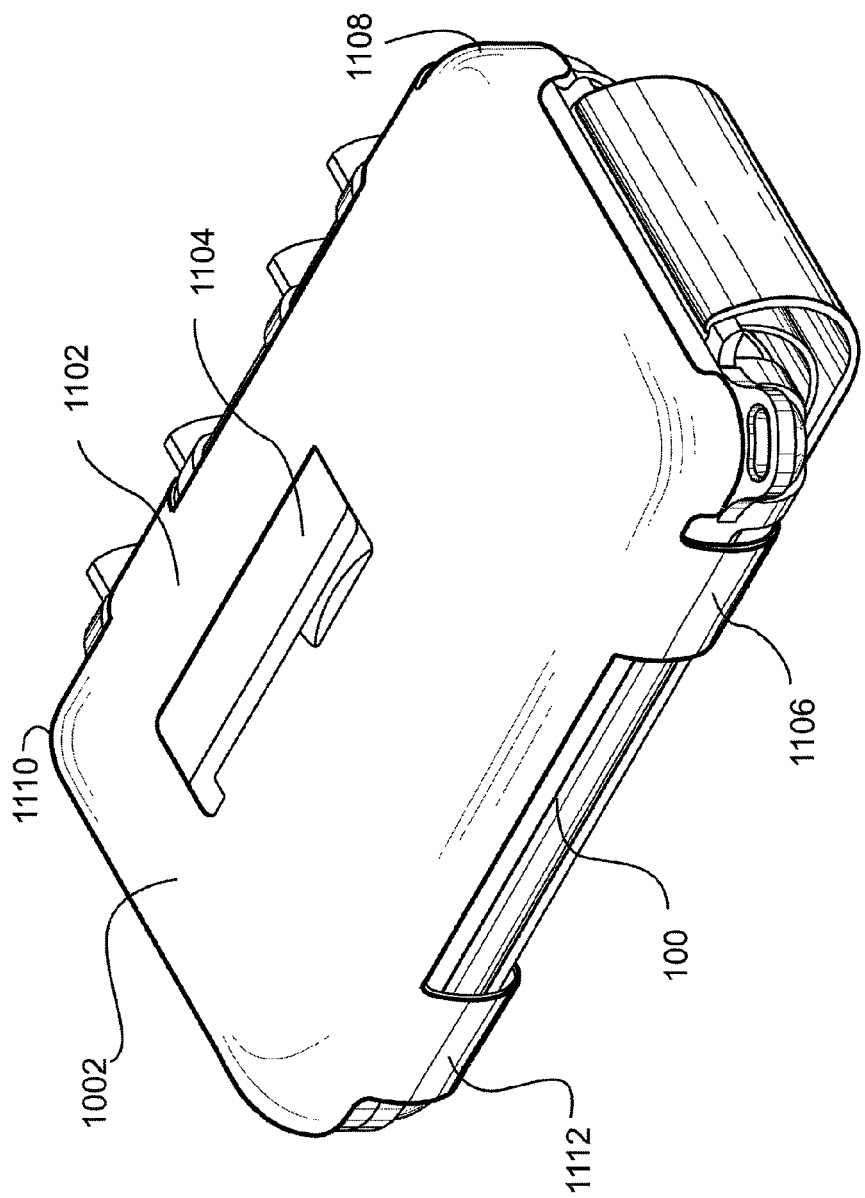
FIG. 11 is a second perspective view of an embodiment that comprises a belt clip.

FIG. 11 illustrates a perspective view of the embodiment of a receiver 1002 shown from the opposite side as FIG. 10. Receiver 1002 comprises a back 1102, a belt clip mechanism 1104, and four clip areas 1106, 1108, 1110, and 1112. The protective case 100 is placed into the receiver 1002 by inserting one end into the receiver, then rotating the protective case 100 into position such that the snapping action of clip areas 1106, 1108, 1110, and 1112 are engaged to hold protective case 100 securely.

Receiver 1002 may be adapted to clip onto a user's belt or may be adapted to be mounted on a wall or other location where the personal electronic device may be stored. The orientation of the protective case 100 is such that the touch screen element of the personal electronic device is protected during normal transport and storage, since the touch screen interface is facing the back 1102 of the receiver 1002.

Receiver 1002 may be made of compliant plastic that allows the clip areas 1106, 1108, 1110, and 1112 to move out of the way and spring back during insertion or removal of the protective case 100. In the embodiment illustrated in FIG. 11, receiver 1002 may be constructed of a single part. In alternative embodiments, receiver 1002 may be constructed of multiple parts and of multiple materials, such as a metal back with spring loaded clips. In other embodiments, special features may be included in the protective case 100 where the receiver 1002 may engage a special feature for securing the protective case 100.

Figure 12:
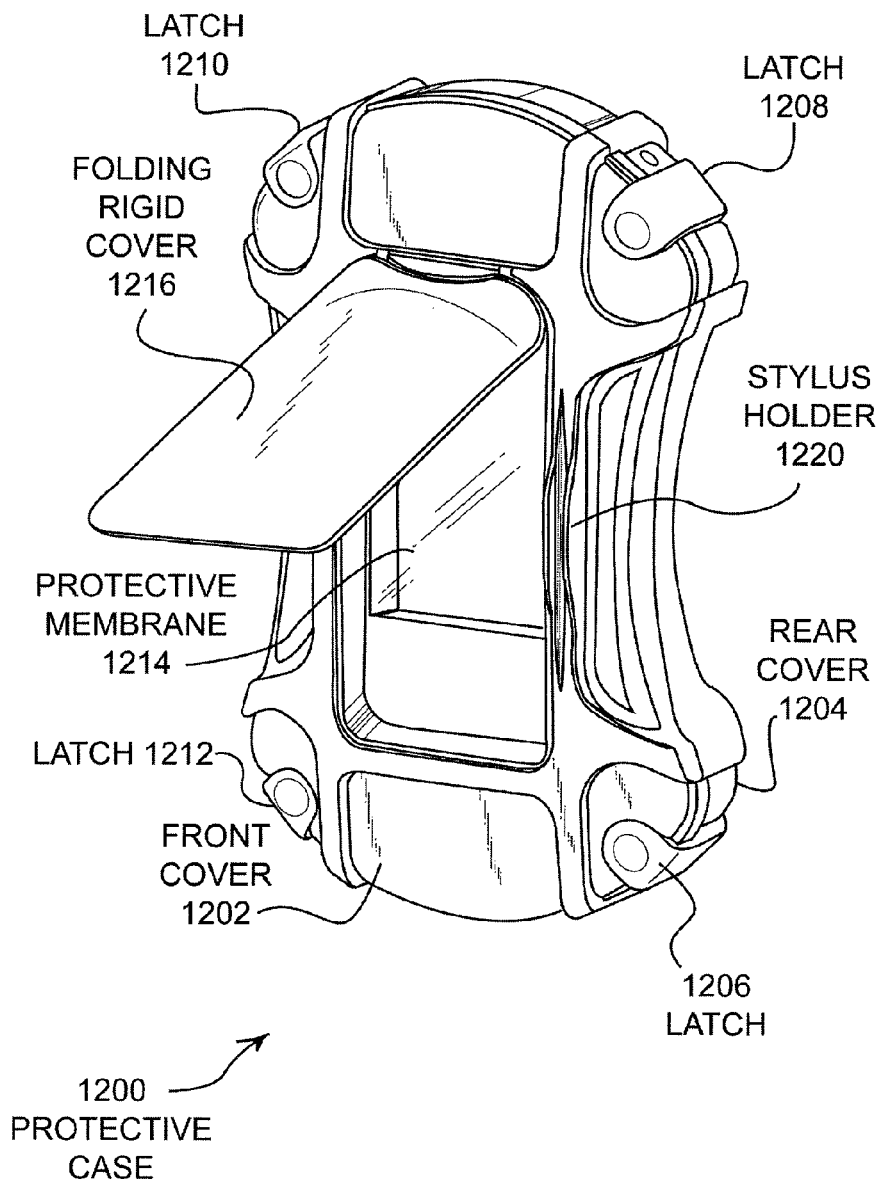
FIG. 12 is a perspective view of another embodiment of the present invention of a protective cover.

FIG. 12 illustrates another embodiment 1200 of a protective case for a personal electronic device or other device. A rigid front cover 1202 and a rigid rear cover 1204 are held together with a series of latches 1206, 1208, 1210, and 1212.

The protective membrane 1214 protects the touchscreen of the enclosed personal electronic device. A folding rigid cover 1216 operates as a rigid shield to prevent the membrane 1214 from any damage. The stylus holder 1220 is formed from an overmolded flexible material in which the membrane 1214 is mounted.

The protective case 1200 illustrates yet another embodiment wherein a rigid protective cover may be used to contain and protect an electronic device, but provide full usable access to a touch screen. The protective membrane 1214 and case may be watertight in some embodiments.

FIG. 13A illustrates an embodiment of a protective enclosure 1300 that encloses and protects a tablet PC 1302. PEDs that have touch screens, as described above, have an interactive flat-panel control, i.e., the touch screen display. Tablet PCs are portable electronic computing devices that have a high-resolution interactive flat-panel control that accepts smooth stylus strokes such as handwriting. The embodiment of FIG. 13A is crush-resistant, impact-resistant, watertight, and simultaneously allows interactive stylus strokes and other sensitive user inputs to be accurately and easily transmitted through a protective screen membrane 1306 to the interactive flat-panel control of tablet PC 1302.

A watertight and shock-absorbing foam cushion 1310 may be fixed and sealed to the underside of the lid 1304 around the interactive flat-panel control opening. The protective screen membrane 1306 is fixed and sealed to the shock-absorbing foam cushion 1310. The shock-absorbing foam cushion 1310 maintains the water tightness of the enclosure. The cushion 1310 also cushions the flat-panel control of the tablet PC 1302 and protects it against breakage if the enclosure and tablet PC are dropped or otherwise subjected to shock. In accordance with the embodiment of FIG. 13A, the shock-absorbing foam cushion 1310 has a thickness of approximately 0.25 inches and extends approximately 0.060 inches below the underside of the interactive flat-panel control opening of the lid 1304. One source of suitable watertight shock-absorbing foam is E.A.R. Specialty Composites of 7911 Zionville Rd., Indianapolis, Ind. 46268. Cushion 1310 allows the protective screen membrane to move a distance of up to 0.125 inches during an impact to the enclosure or when pressure is applied to protect membrane 1306 while pushing the tablet PC control buttons 1308 or writing on the interactive flat-panel control with a stylus through the membrane. The shock-absorbing foam cushion 1310 also pushes the protective screen membrane 1306 flatly against the surface of the interactive flat-panel control of the tablet PC 1302 so that sensitive user stylus strokes and other inputs are accurately transmitted. The pressure of the cushion 1310 on the protective screen membrane 1306 which holds the protective screen membrane 1306 flatly against the interactive flat-panel control of the tablet PC 1302 also keeps display images, viewed through the protective screen membrane, clear and distortion-free. In embodiments of the protective enclosure to protect a touch-screen device, the protective membrane may be adjacent to the touch screen but does not exert mechanical pressure on the touch screen so that mechanical inputs such as style strokes are sensed only when intended. In embodiments of the protective enclosure to protect a tablet PC that has an RF stylus or to protect a handheld device that a capacitance-sensing interactive flat-panel control, the protective membrane may be pressed flat against the interactive flat-panel control which allows undistorted viewing but does not adversely affect the control since the interactive control uses capacitance or radio frequencies for interactive input instead of mechanical pressure.

The protective screen membrane 1306 in the embodiment of FIG. 13A is at least partially transparent and has a thickness of approximately 0.010 inches. The thickness of the protective screen membrane 1306 should be typically in the range of 0.001 inches to 0.020 inches so that stylus strokes on the upper surface of protective screen membrane 1306 are transmitted accurately to the interactive flat-panel control of the tablet PC 1302. Likewise, protective screen membrane 1306 may be flexible, semi-rigid or rigid and may be made of polyvinylchloride or other suitable transparent thermoplastic, such as, for example, polyvinylchloride, thermoplastic polycarbonate, thermoplastic polypropylene, thermoplastic acrylonitrile-butadiene-styrene, thermoplastic polyurethane, which has a hardness and texture that permits the stylus to smoothly glide across the surface without skipping, grabbing, or catching against the surface and glass, such as thin tempered glass. Some tablet PCs utilize a stylus which transmits strokes to the PC by way of radio frequency transmission. Protective screen membrane 1306 may be made of a rigid, clear, engineered thermoplastic such as, for example, thermoplastic polycarbonate or other thermoplastics as described above, for enclosing a tablet PC or a glass layer. A protective screen membrane 1306 that is rigid may include watertight access ports that allow operation of mechanical buttons or switches of the tablet PC 1302, such as, for example, control buttons 1308. The watertight access ports may include holes that have a moveable watertight plug, or any type of watertight button or lever. Protective screen membrane 1306 may include an anti-glare coating or can be made with an anti-glare texture so that display images are clearly viewable without distortion through the protective screen membrane 1306. In the embodiment of FIG. 13A, the lid 1304 of the protective enclosure 1300 may have an external stylus holder 1324 that securely holds a stylus used with the tablet PC 1302.

The lid 1304 and the base 1312 may have air-permeable watertight vents 1318, 1326 that permit the cooling fans of the tablet PC 1302 to force air exchange to dissipate heat by convection so that the tablet PC 1302 does not overheat. Watertight vents 1318,1326 may comprise holes in the lid 1304 and base 1312 that are made watertight by covering and sealing the holes with an air-permeable watertight membrane such as, for example, a fabricated expanded polytetrafluoroethylene (ePTFE) membrane. One source that fabricated expanded polytetrafluoroethylene (ePTFE) membranes is available from is W. L. Gore & Associates, Inc. of 555 Papermill Road, Newark, Del. 19711.

The embodiment of FIG. 13A may also comprise a pod door 1322 that allows access to table PC interfaces such as, for example, PCMCIA or Smart Card slots. The pod door 1322 is attached to the lid 1304 so that it may be removed or opened. In the embodiment of FIG. 13A, the pod door 1322 is hingedly connected to a portion of the base 1312 at a location of the base 1312 that has an opening that allows access to the tablet PC interfaces. The opening can be covered by a watertight seal 1320, such as, for example, an O-ring that is part of pod door 1322.

The underside of the lid 1304 also has a watertight seal, such as an O-ring, so that when compound latches 1328, 1330, 1332 and 1334 are closed, the O-ring or seal of the lid 1304 forms a watertight seal against the base 1312. The protective enclosure 1300 protects the tablet PC 1302 from water and dust intrusion sufficient to comply with Ingress Protection (IP) rating of IP 67, i.e., the protective enclosure totally protects the enclosed tablet PC from dust and protects the enclosed tablet PC from the effects of immersion in one meter of water for 30 minutes.

The protective enclosure of the embodiment of FIG. 13A may further comprise protective overmolding 1316 attached to the lid 1304. A similar overmolding may be attached to the base 1312. The protective overmolding 1316 may be made of material that is easily gripped in slippery conditions and provides additional shock absorption such as, for example, rubber or silicone. The protective overmolding 1316 extends above the surface of the lid in pre-determined areas to provide protrusions that are easily gripped even in slippery conditions. The protective enclosure of the embodiment of FIG. 13 may further comprise watertight plugs such as access port plug 1314 that fit snugly into openings in the base 1312 that provide access to various interfaces, connecters and slots of the tablet PC 1302.

Figure 13B:
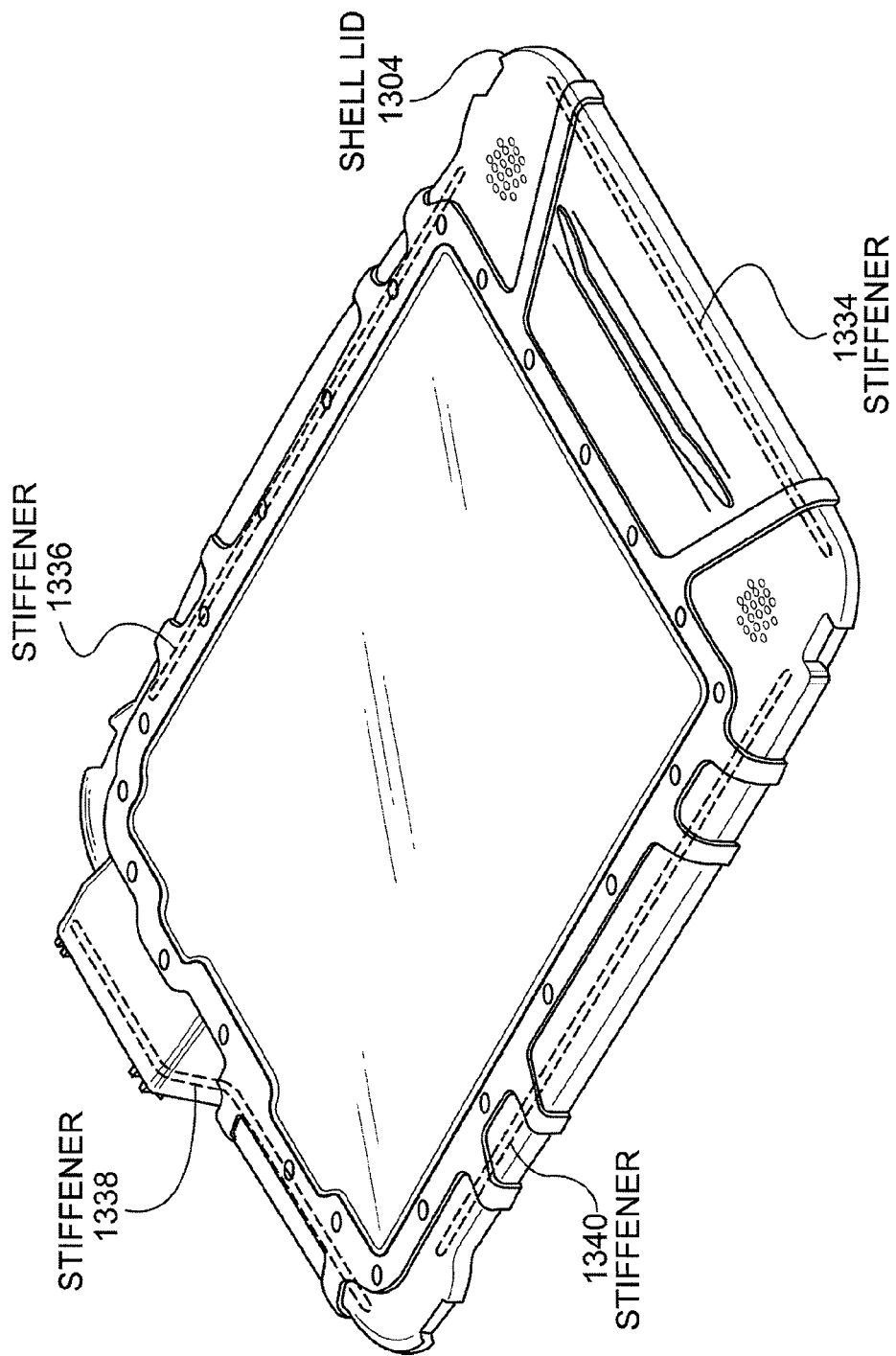
FIG. 13B is a view of the protective enclosure lid of FIG. 13A.

FIG. 13B illustrates a shell lid 1304 of the embodiment of FIG. 13A. Shell lid 1304 and base 1312 may be made of impact/crush resistant material such as glass-fiber reinforced engineered thermoplastic, such as for example, glass reinforced polycarbonate. Alternatively, the shell lid 1304 and shell base may be made of thermoplastic polycarbonate, thermoplastic polypropylene, thermoplastic acrylonitrile-butadiene-styrene, and thermoplastic compositions containing one or more thereof, or other engineered thermoplastics that provide a shock-resistant and impact resistant shell may be used. The engineered thermoplastics may be reinforced with glass fibers, carbon fibers, metal fibers, polyamide fibers and mixtures thereof. Shell lid 1304 may be further reinforced with stiffeners 1334, 1336, 1338, 1340 that are integrally embedded into the shell lid around the perimeter of an opening in the shell that is directly over the interactive flat-panel control portion of the tablet PC. The stiffeners made be made of steel or other hard material so that the stiffeners provide additional strength and prevent flexing of the lid 1304 which enhances the watertightness and the impact/crush resistance.

Figure 14:
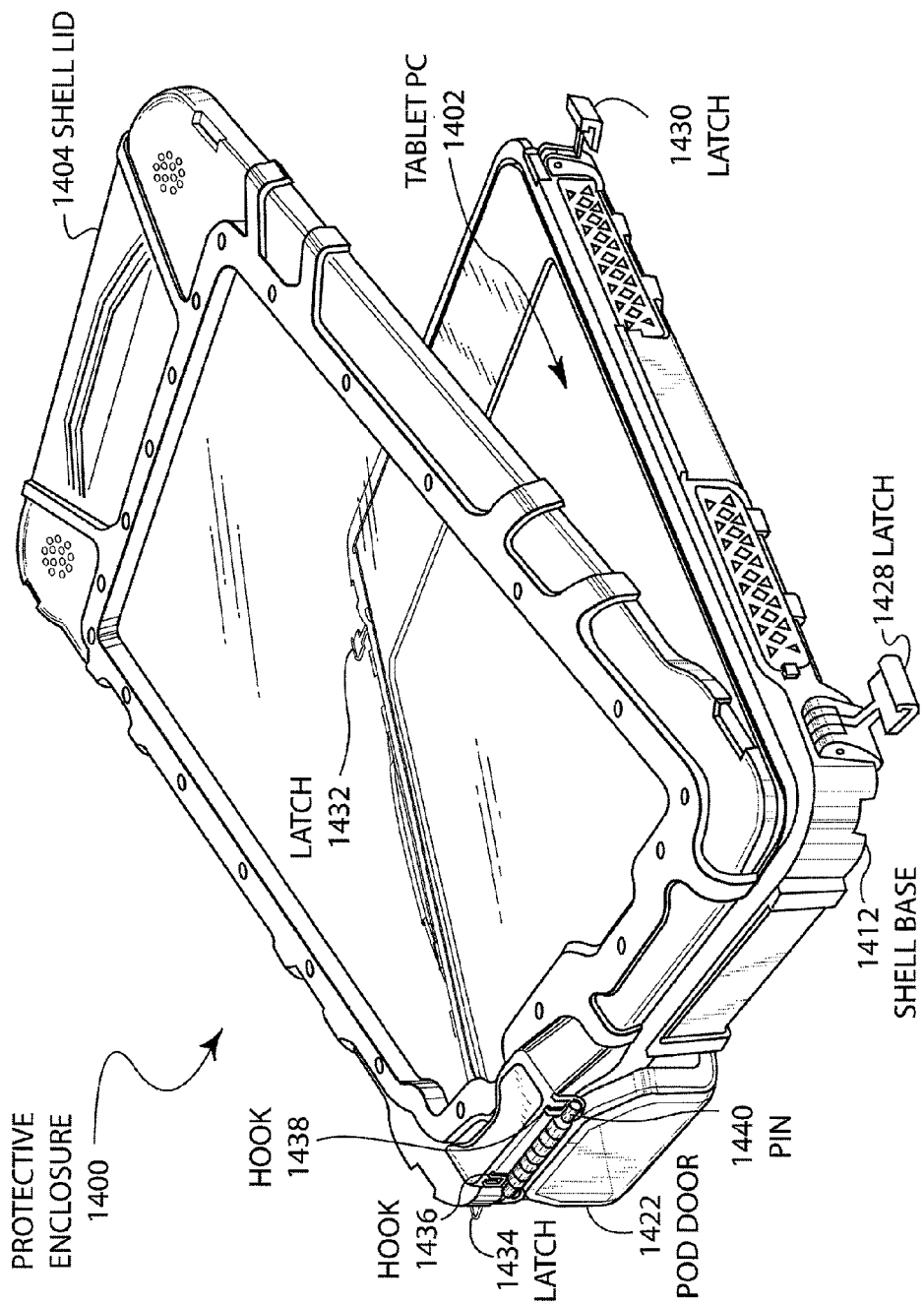
FIG. 14 is a perspective top view of the embodiment of FIG. 13A with an open lid.

FIG. 14 is an illustration of the embodiment of FIG. 13A with the lid 1404 partially removed from the base 1412. To protect the tablet PC 1402 using the protective enclosure 1400, the tablet PC 1402 is disposed to fit snugly into the base 1412. The lid is oriented so that hooks 1436, 1438 area aligned with pin 1440 that is connected to a portion of the base 1412 and the lid is closed so that hooks 1436, 1438 are retained by pin 1440. Compound latches 1428, 1430, 1432, 1434 are then snapped onto the lid so that the lid is compressed tightly against the base providing a watertight seal.

Figure 15:
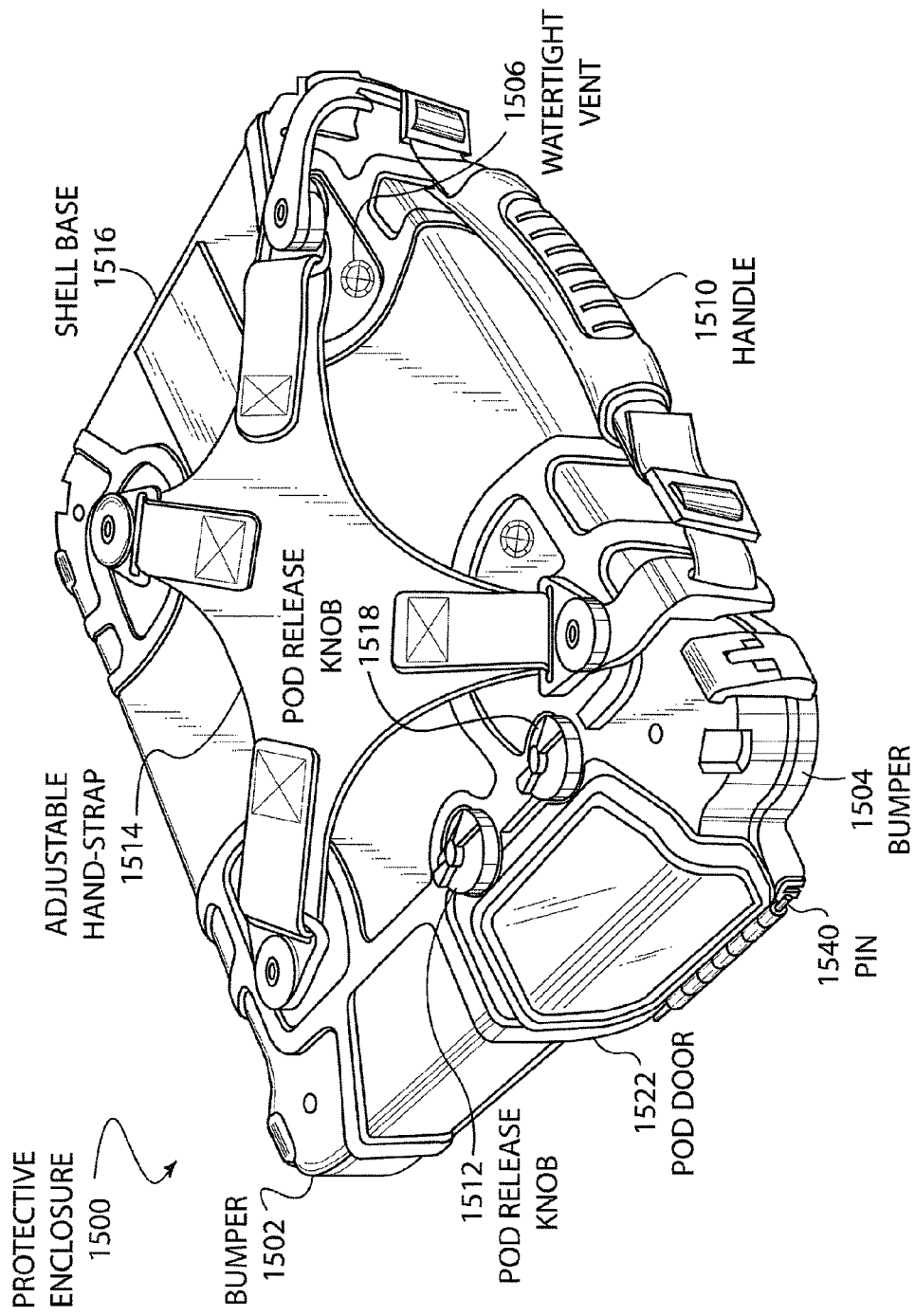
FIG. 15 is a perspective bottom view of the embodiment of FIG. 13A.

FIG. 15 is a bottom view of the embodiment of FIG. 13. The base 1516 of protective enclosure 1500 includes watertight vents such as watertight vent 1506 for air exchange to permit heat and sound dissipation from the enclosed tablet PC while at the same time maintaining watertightness.

Pod release knobs 1512, 1518 are attached to the base 1516 so that the knobs can be rotated clockwise to securely wedge against an edge of pod door 1522 to close the pod door 1522 tightly against a rim around an the pod opening in base 1516 to create a watertight seal. Knobs 1512, 1518 can be rotated counter-clockwise to release pod door 1522 to access the interfaces of the tablet PC covered by pod door 1522.

To provide additional protection against mechanical shock, heavy-duty corner bumpers such as bumper 1504 may be securely attached to the corners of base 1516.

As shown in FIG. 15, an adjustable heavy-duty handle [1510] may be attached to the base 1516 of the protective enclosure 1500 to allow easy and reliable transportation of the protective enclosure 1500 that encloses a tablet PC. In some circumstances, it is convenient to hold the protective enclosure using hand strap 1514 that is made of strong slightly stretchable fabric. Hand strap 1514 attaches to four points of the base 1516 to that a user's hand or wrist can be inserted along the either the longer or shorted length on the protective enclosure 1500 and enclosure tablet PC. Hand strap 1514 may be made of neoprene or other strong stretchable material to securely hold the protective enclosure to the user's arm even in slippery conditions. The protective enclosure may further include a neck strap to provide a comfortable solution for using the tablet PC while standing.

Figure 16:
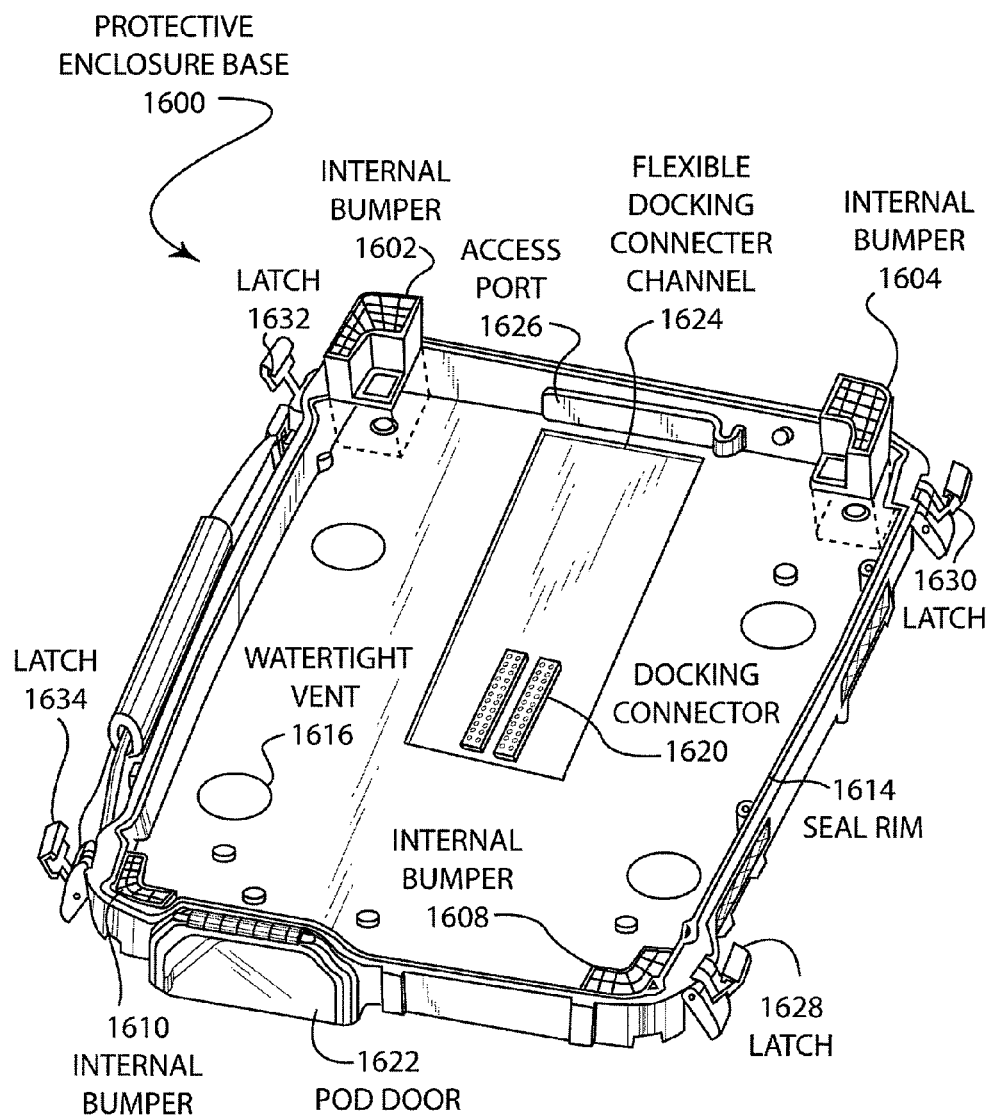
FIG. 16 is a perspective view of the base of the embodiment of FIG. 13A.

FIG. 16 illustrates a top view of the protective enclosure base 1600. Watertight vents such as watertight vent 1616 allow air exchange for heat dissipation and sound transmission from an enclosed tablet PC. Seal rim 1614 is an integrally formed part of the protective enclosure 1600 which is compressed against an O-ring in the protective enclosure lid to provide a watertight seal when compound latches 1628, 1630, 1632, 1634 are closed onto the lid. Internal bumpers 1602, 1604, 1608, 1610 attach to the interior corners of protective enclosure base 1600 to provide cushion and mechanical shock protection to an enclosed tablet PC. The L-shape and non-solid interior of internal bumpers 1602, 1604, 1608, 1610 allows the bumpers to deflect and absorb the shock if the enclosed tablet PC is dropped or otherwise subjected to mechanical shock. The protective enclosure provides shock absorption sufficient to meet MIL-STD 810F, Method 516.5, Procedure 4 which is a Transit Drop Test. In the Transit Drop Test, the protective enclosure encloses a tablet PC or a mass equivalent to a tablet PC. The protective enclosure is sequentially dropped onto each face, edge and corner for a total of 26 drops over plywood from a height of 48 inches. The protective enclosure is visually inspected after each drop and a functional check for leakage is performed after all drops are completed.

Some tablet PCs have a docking connector disposed on the underside of the tablet PC so that the tablet PC can connect to power and signals. For example, emergency vehicles such as ambulances, fire trucks, or patrol cars, may have a docking station installed near the driver's seat onto which the driver may dock a tablet PC. The embodiment of protective enclosure base 1600, as illustrated in FIG. 1, may comprise a docking connector channel 1624 that is recessed with respect to the upper surface of the base that allows a docking connector to run from a docking connector that is disposed in the center underside of the tablet PC to access port 1626. Alternatively, a docking pass-through connector 1620 may be made an integral and watertight part of the protective enclosure base 1600 so that the tablet PC docking connector attaches to the docking pass-through connector 1620 which, in turn, connects to the docking station in substantially the same manner as an unenclosed tablet PC.

Figure 17:
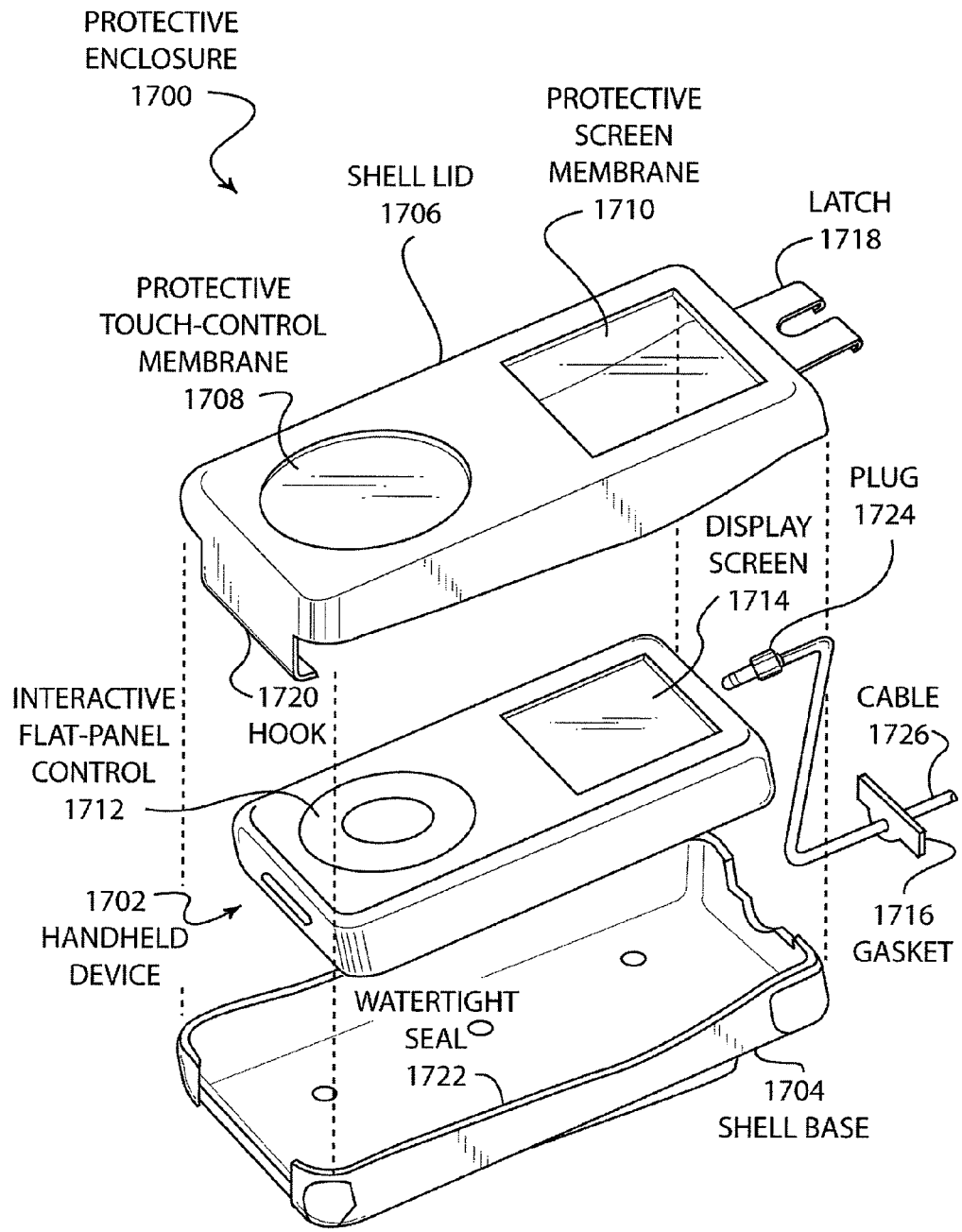
FIG. 17 is an exploded view of an embodiment of a protective enclosure for an interactive panel controlled device.

FIG. 17 illustrates another embodiment of protective enclosure 1700 for a handheld electronic device 1702 that has an interactive flat-panel control such as, but limited to, a capacitance-sensing interactive flat panel control, a touch screen or other interactive control. Handheld electronic devices that have an interactive flat-panel control benefit from being enclosed in a rugged protective enclosure that is crush-resistant, watertight and shock-resistant and that simultaneously allows the user to interact with a sensitive interactive flat-panel control. Handheld electronic devices that have interactive flat-panel control may include music players, MP3 players, audio player/recorders, video players, computers, personal digital assistants (PDAs), GPS receivers, cell phones, satellite phones, pagers, monitors, etc. For example, Apple Computer iPod® is a popular handheld interactive device that plays MP3 or otherwise digitally-encoded music/audio. The Apple iPod® has an interactive flat-panel control in which a portion of the front panel is a flat-panel display and portion of the front panel is an interactive flat-panel control, called a touch wheel in some versions of the iPod® and click wheel in other versions of the iPod®, that has capacitive touch/proximity sensors. One function of such an interactive flat-panel control, i.e. touch wheel, is that the control can emulate a rotary control knob by sensing circular motion of a user's finger using capacitive sensors. The click wheel has the same function with the additional feature of sensing proximity of a user's finger and emulating button presses by a user's finger at pre-determined areas.

In the embodiment of FIG. 17, the shell lid 1706 and the shell base 1704 are made of polycarbonate or other engineered thermoplastics such as polyethylene, polypropylene, etc. that are crush-resistant and impact resistant. Shell base 1704 has a watertight seal 1722, which may be an overmolded gasket, o-ring, liner or other seal that prevents water from entering the protective enclosure 1700 when the handheld interactive device 1702 is enclosed inside the protective enclosure 1700. Shell base 1704 and shell lid 1706 may include watertight vents, electrical connectors, see-through areas or features as disclosed with respect to FIG. 1.

In the embodiment of FIG. 17, shell lid 1706 includes apertures over predetermined portions of the handheld interactive device 1702, such as the areas directly over the display screen 1714 and the interactive flat-panel control 1712, or other designated areas, as desired. A protective screen membrane 1710, that is at least partially transparent, is permanently or removably fixed in a watertight manner to the underside of shell lid 1706 in the aperture that is over the display screen 1714. The protective screen membrane 1710 may be recessed with respect to the upper surface of the shell lid 1706 which provides protective elevated rim that protects the display screen 1714 from breakage. Protective screen membrane 1710 may be PVC, silicone, polyethylene or other material that is watertight and rugged. In the case that display screen 1714 is a touch screen, the protective screen membrane 1710 should be smooth enough and thin enough that stylus strokes and other inputs are transmitted accurately to the touch screen as disclosed above with respect to FIG. 1, FIG. 12, and FIG. 13. Alternatively, it may be desirable not to have an aperture in shell lid 1706 for a protective membrane 1710. In another embodiment, the shell lid 1706 can be made of a transparent material so that a transparent window can be formed in the shell lid 1706 in place of the protective screen membrane 1710. The transparent window is aligned with the display screen 1714 so that the user can view the display screen 1714. In this case, a protective elevated rim that is aligned with the display screen 1714 is not required in the shell lid 1706 to protect the display screen 1714 from damage since there is no protective screen membrane 1710. If the display screen 1714 is a touch screen, the material of the shell lid 1706 that is aligned with the display screen 1714 to provide a window can be made thinner to allow the touch screen to properly operate.

As also shown with respect to the embodiment of FIG. 17, a protective control membrane 1708 is permanently or removably fixed in a watertight manner to the underside of shell lid 1706 in an aperture that is aligned with the interactive flat-panel control 1714 of the handheld device 1702. The protective screen membrane 1710 is recessed with respect to the upper surface of the shell lid 1706 which provides protective elevated rim that protects the display screen 1714 from breakage and provides tactile feedback that guides a user's finger to the desired area, even in slippery conditions. Of course, the protective elevated rim may simply comprise the portion of the shell lid 1706 that is formed as a result of making an aperture in the shell lid 1706 and overmolding a protective touch-control membrane 1708 on an inside surface of the shell lid 1706. In other words, the thickness of the shell lid 1706 creates a protective rim that is elevated with respect to the membrane since the protective touch-control membrane 1708 is overmolded or otherwise attached to the back side of the shell lid 1706. In that case, the rim is not elevated with respect to the surface of the shell lid 1706, but rather, is elevated with respect to the membrane to form a protective rim.

Interactive flat-panel control 1712 has capacitive sensors, which are part of a proximity/touch detector circuit. When a grounded object, such as a person's finger, which has free air capacitance of several hundred picofarads, is brought close to the capacitive sensors, the total capacitance measured by the detector circuit increases because the capacitance of the object with free air capacitance adds to the capacitance of the sensors since the total capacitance of two capacitors in parallel is additive. Multiple sensors may also be arranged so that movement of an object with free air capacitance can be detected, for example, movement of a person's finger in a circular motion analogous to turning a mechanical control knob. Some examples of interactive flat-panel controlled PED's include iPod® and iPod® Mini music and audio players from Apple Computer. In some PEDs, such as the Apple iPod®, capacitive sensors may be disposed below a front panel made from a dielectric such as polycarbonate, which has a dielectric constant in the range of 2.2-3.8. In the embodiment of FIG. 17, the protective control membrane 1708 is made of thin polycarbonate that is slightly flexible or other engineered thermoplastics that provide the rugged watertight protection and at the same time permit the capacitive sensors of the interactive flat-panel control 1712 to function correctly. Likewise, a protective control membrane 1708 with a dielectric constant that is too high may retain an electric charge long enough to reduce the response rate of the sensor to motion of a user's finger from one capacitive sensor zone of the interactive flat-panel control 1712 to another. A protective control membrane 1708 that is conductive or has a dielectric constant that is too low may diminish the sensitivity of the capacitive sensor by combining in series the capacitance of the protective membrane and the dielectric front panel of the PED which results in a lowering of the overall capacitance.

Total capacitance between an object, such as a finger touching the protective control membrane 1708, and interactive flat-panel control 1712 is a function of the thickness and the dielectric constant of the protective control membrane 1708. The capacitance between the object, such as a finger, and the capacitive sensors of the interactive flat-panel control 1712 is proportional to the distance between the object and the sensors. The sensitivity of the capacitive sensors to the object may be diminished or completely eliminated if the protective control membrane 1708 is too thick. In the embodiment of FIG. 17, the thickness of the protective control membrane is approximately 0.020 inches. The protective control membrane 1708 may be any thickness in the range of 0.003 inches to 0.020 inches that is adequate to provide a rugged watertight membrane through which capacitance can be correctly sensed by the interactive flat-panel control 1712.

In general, with respect to any of the membranes that are used with an electronic device that uses a touch screen, which includes any type of interactive control panel, the type of touch screen cover that is used on the protective enclosure will depend on the type of touch screen that is used by the electronic device. Essentially, there are three basic types of touch screens that are currently used, i.e., the resistive, capacitive and surface acoustic wave types of touch screens. Resistive touch screens have a glass panel that is covered with a conductive and a resistive metallic layer. These two layers are held apart by spacers. An electric current is separately applied to the two layers. When a user touches the screen, the two layers make contact at the spot where the user touches the screen. A change in the electric field is detected and the coordinates of the point of contact are then calculated by a processor in the electronic device. Once the coordinates are known, the information is used by the electronic device.

In a capacitive type of touch screen, a layer that stores electrical charge is placed on a glass panel that forms part of the touch screen system. When a user touches the touch screen with a finger, the charge is transferred to the user, so that the charge on the layer that stores the electrical charge decreases. This decrease in the electrical charge is measured by circuits located at each corner of the touch screen. The relative differences in the charge at each corner are measured and these measurements are used by a processor to calculate exactly where the touch event took place on the touch screen. The calculated location is then used by the electronic device to process the information.

Surface acoustic wave touch screens operate using two transducers. One transducer is used to receive surface acoustic waves and the other one is used to send surface acoustic waves. These transducers are placed along the X and Y axis of the glass plate of the touch screen. Reflectors are also placed on the glass plate of the touch screen that reflect an electrical signal sent from one transducer to the other. The receiving transducer is able to tell if the wave has been disturbed by a touch event at any instant and can locate the touch event accordingly. Surface acoustic wave touch screens have no metallic layers on the screen, which allows 100 percent of the light to penetrate the touch screen system.

Another type of touch screen system is a multi-touch screen system that is used in the iPhone®. The multi-touch system includes a layer of capacitive material, but the capacitors are arranged in a coordinate system. Circuitry is used to sense changes at each point along the grid of the capacitors, so that every point on the grid generates its own signal when touched, which is sent to a processor in the electronic device. This allows the touch screen to determine the location and movement of simultaneous touches in multiple locations. Because of the reliance of this type of system on capacitive material, the iPhone® works only if it is touched with a fingertip and will not work with a stylus, or if the user wears non-conductive gloves. Further, these types of systems can either use mutual capacitance or self-capacitance. In mutual capacitance systems, the capacitive circuitry requires two distinct layers of material. One layer of material houses drive lines, which carry current, and the other layer of material houses sensing lines, which detect the current at nodes. In self capacitance systems, there is only one layer of individual electrodes connected with capacitance sensing circuitry.

Hence, selection of the touch screen cover requires that the material that is used for the touch screen cover be amenable to the type of touch screen 1302 used by the electronic device 1304. For example, for iPhones®, a material suitable for transmitting capacitive inputs must be used, as more fully disclosed in U.S. Pat. Nos. 6,646,846, 6,995,976, 7,158,376 and 7,180,735, and U.S. patent application Ser. Nos. 11/270, 732, 11/420,683, 11/456,157, 11/466,342 and 11/676,986, which are specifically incorporated herein by reference for all that they disclose and teach. Suitable materials include Lexan or other types of polycarbonates that are on the order of 0.010 inches thick, to transmit the capacitive input. Alternatively, PVC or silicon may be used with a cross-sectional thickness that is sufficiently thin to allow interactability. For example, thin layers of glass can be used that are capable of transmitting the capacitive input. Although thicknesses on the order of 0.010 inches may be preferable, thicknesses ranging from 0.005-0.035 inches will still allow operation of a capacitive type of touch screen. Of course, any type of thin material, such as glass, polycarbonate, Lexan, PVC, or other thin plastic material, as indicated above, can be used, as long as the layer is sufficiently thin to allow transmission of the capacitive input and the plastic material is a material that is non-conductive and will allow transmission of the capacitive input.

If a resistive type of touch screen is used, the touch screen cover may be flexible to allow deflection of the touch screen cover to flex against the resistive touch screen of the electronic device, so that the layers of the resistive touch screen are deflected and touch each other.

Referring again to FIG. 17, the upper surface of the protective control membrane 1708 has a velvet/matte texture with a texture depth of 0.0004 to 0.003 inches that reduces the surface area of the membrane that is in frictional contact with the user's finger and permits a user's finger to glide rapidly upon the surface of the membrane without catching or sticking as a result of the reduced friction. The hardness of the polycarbonate material, or other hard engineered thermoplastic, also reduces the friction.

Headphones or other accessories may be electrically connected to handheld device 1702 the through the protective enclosure 1700 by disposing the wire of the headphone or accessory in an insertable gasket 1716 which fits snugly into one end of the shell base 1704.

Figure 18:
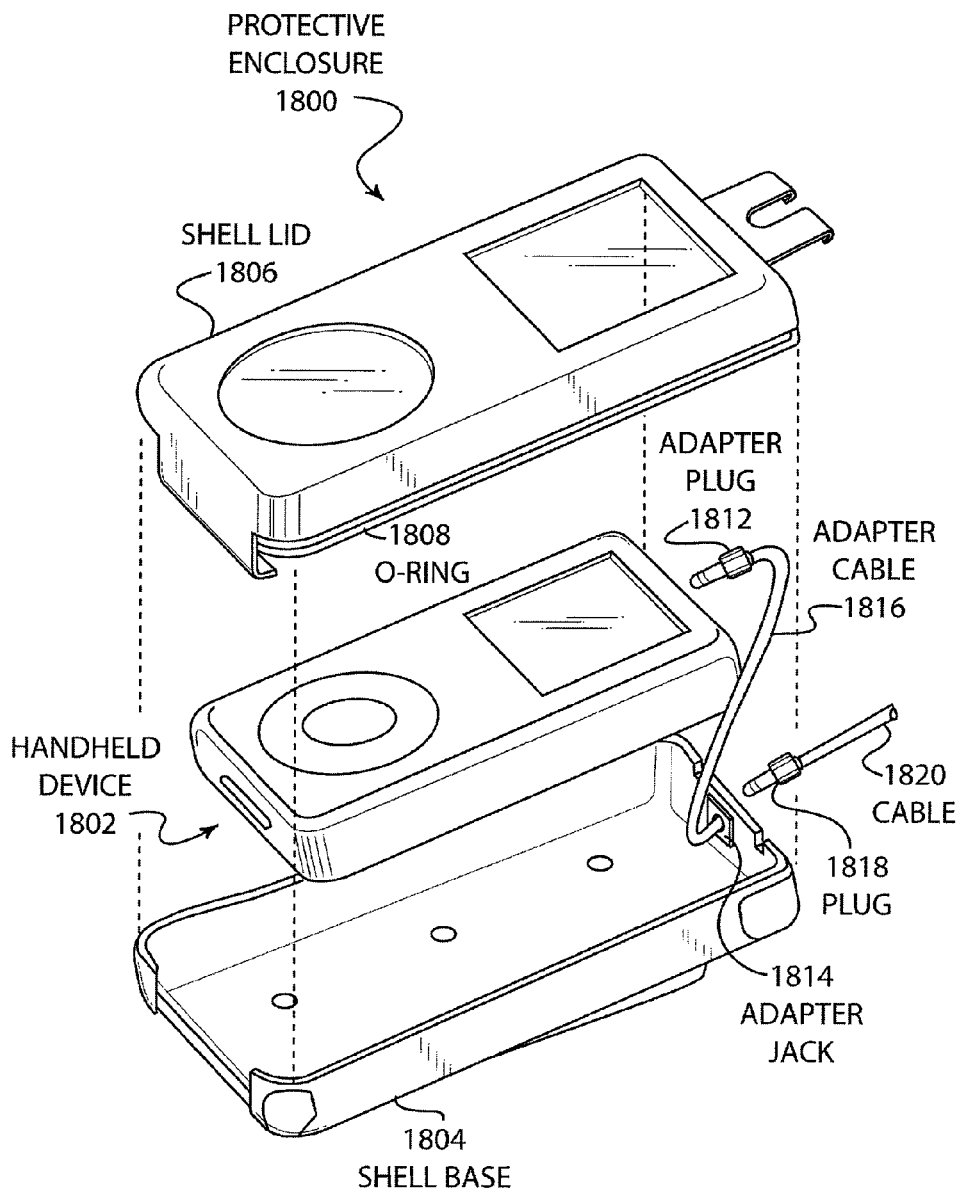
FIG. 18 is an exploded view of another embodiment of a protective enclosure for an interactive panel controlled device.

FIG. 18 illustrates another embodiment of protective enclosure 1800 which is substantially the same as protective enclosure 1700 of FIG. 17. However, protective enclosure 1800 has an alternative electrical pass-through for accessories. In the embodiment of FIG. 18, shell base 1804 includes an adapter cable 1816 that has an adapter plug 1812 at one end which plugs into a jack of handheld device 1802. At the other end of the adapter cable 1816 is an adapter jack 1814 that is molded into, or otherwise integrally made part of, shell base 1804. An external accessory, such as a pair of headphones, may then be plugged into the adapter jack 1814 while the handheld device 1802 in enclosed in protective enclosure 1800. A cable 1820 with a plug 1818 can be used to connect the external accessory. Alternatively, a one-piece adapter that includes both a jack 1814 and a plug 1812 without a cable 1816 may be integrally disposed into shell base 1804.

Shell lid 1806 is adapted to retain an O-ring 1808 that seals the protective enclosure 1800 when shell lid 1806 is latched tightly onto shell base 1804 so that water cannot enter protective enclosure 1800.

Protective enclosures, such as protective enclosure 1700 and protective enclosure 1800, are more fully disclosed in U.S. patent application Ser. No. 12/134,120, filed Jun. 5, 2008, by Curtis R. Richardson, et al., which is specifically incorporated herein by reference for all that it discloses and teaches.

Figure 19:
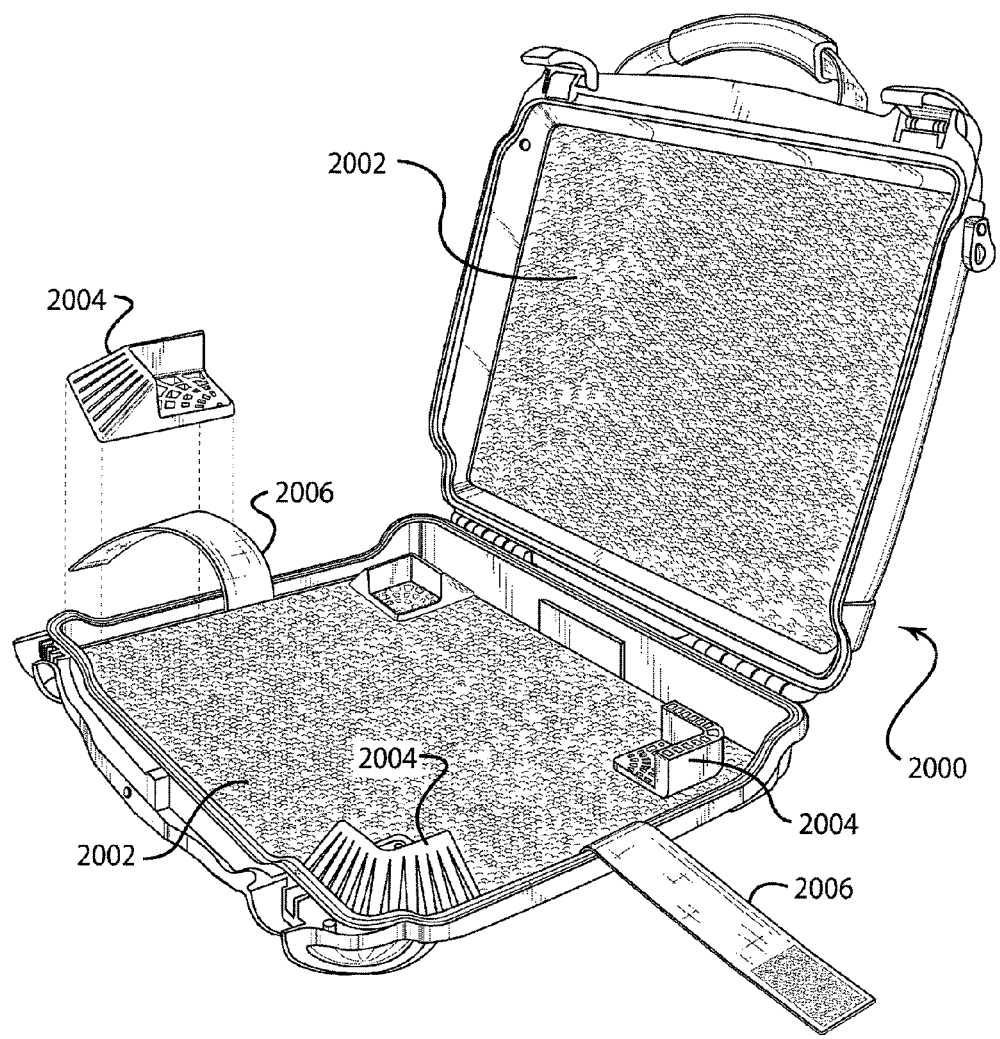
FIG. 19 is an exploded view of another embodiment of a protective enclosure with an open lid for a laptop computer device.

FIG. 19 illustrates in the open position a crush-resistant, impact-resistant, watertight, protective enclosure 2000 for an electronic device, such as a laptop computer. The protective enclosure 2000 may be manufactured in a manner similar to the enclosure of FIG. 13 comprising an impact/crush resistant material such as glass-fiber reinforced engineered thermoplastic, such as for example, glass reinforced polycarbonate. It may also be made of thermoplastic polycarbonate, thermoplastic polypropylene, thermoplastic acrylonitrile-butadiene-styrene, and thermoplastic compositions containing one or more thereof, or other engineered thermoplastics that provide a shock-resistant and impact resistant shell.

The inside of the enclosure is covered with a hook and loop liner 2002. Shock absorbing corner bumpers 2004 have hook and loop type bases so that they may attach at any point on the liner inside the enclosure at the corners of the electronic device to secure electronic devices of various sizes and provides a shock absorbent suspension system for the devices. The shape of the bumpers may vary in size and in depth. They may also vary such that the laptop is raised a predetermined height for the bottom of the enclosure so that there may be access to the ports and external drives such as CD and DVD. These bumpers allow the enclosure to be adaptable to most laptop computers by placing it inside the enclosure and securing it into position with the bumpers 2004. Straps 2006 also secures the laptop into position.

Figure 20:
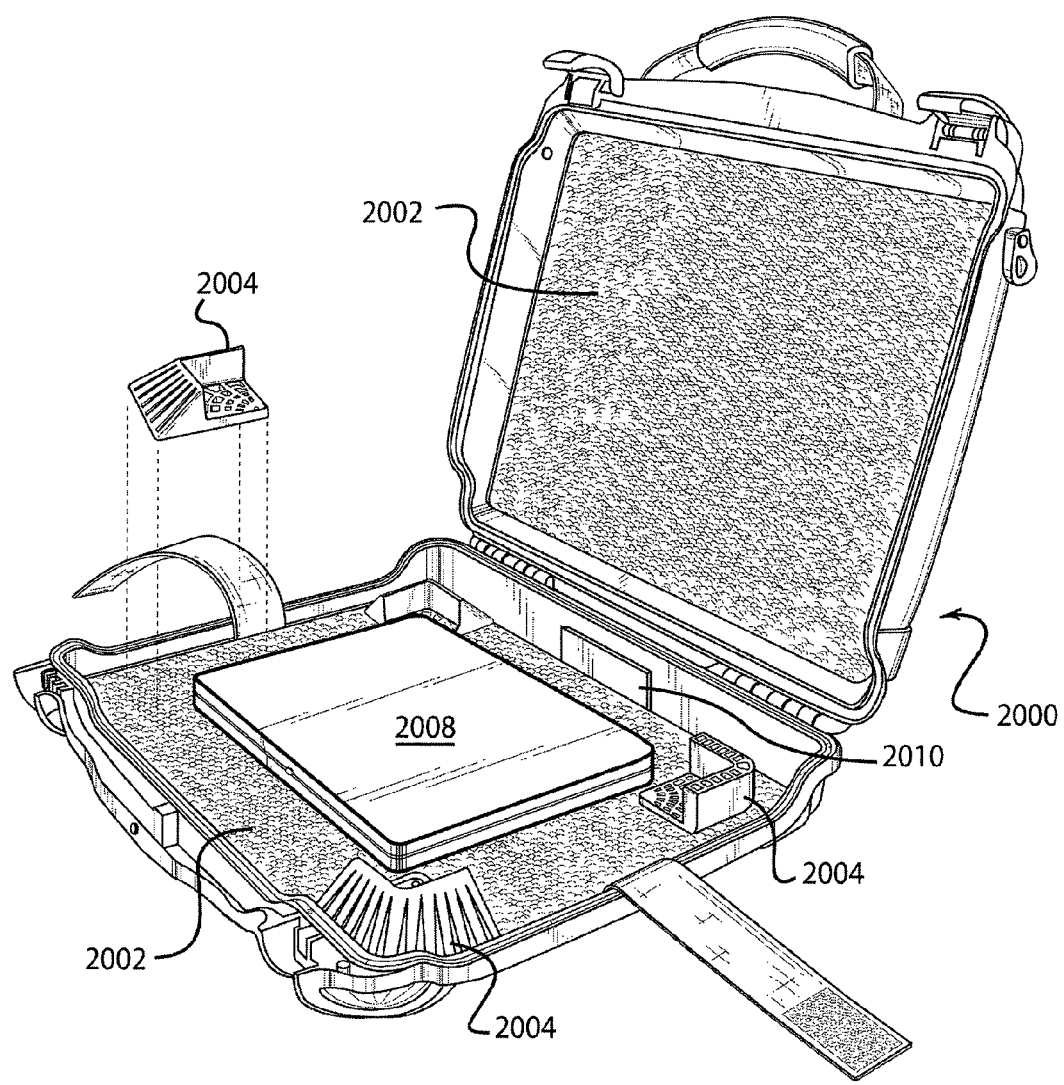
FIG. 20 is an exploded view of a protective enclosure with an open lid for a laptop computer device positioned inside the enclosure.

FIG. 20 illustrates a laptop 2008 secured in position as described above. An opening for a door or docking position 2010 may be provided that allows the case to be prewired for power or other USB connections. The watertight access ports may include holes that have a moveable watertight plug, or any type of watertight button or lever.

The liner 2002 may also have some cushioning that cushions the laptop and protects it against breakage if the enclosure and laptop are dropped or otherwise subjected to shock. Normally, however, most of the cushioning is provided by the corner bumpers and the liner is not cushioned. In accordance with the embodiment of FIG. 19, the liner 2002 has a thickness of approximately 0.125.

Figure 21:
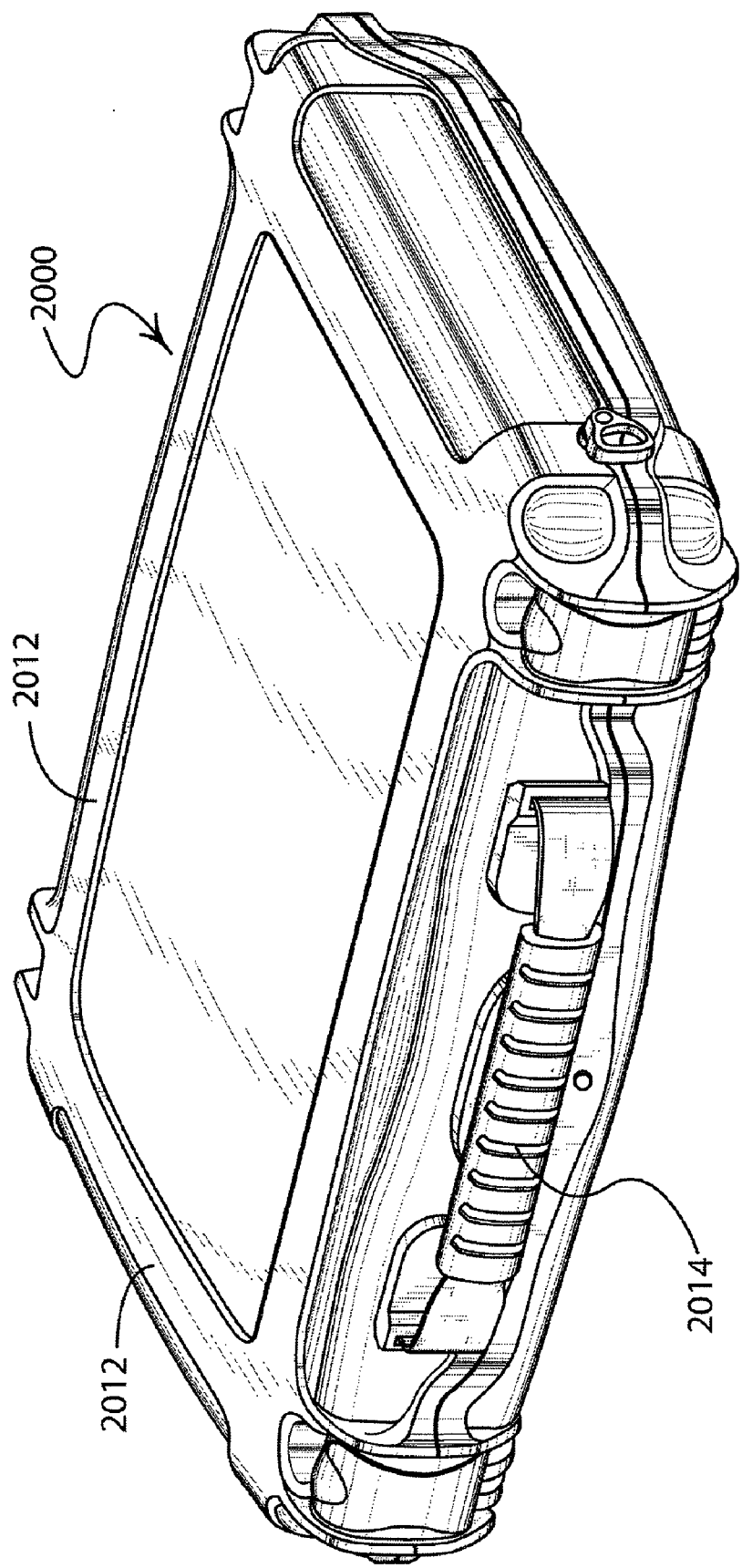
FIG. 21 is a perspective top view of a protective enclosure with a closed lid for a laptop computer device.

This enclosure is also adaptable to protect PC tablets of the type illustrated in FIG. 13A. The hook and loop liner may be adjacent to the touch screen but does not exert mechanical pressure on the touch screen so that mechanical inputs such as style stokes are sensed only when intended. The engineered thermoplastics may be reinforced with glass fibers, carbon fibers, metal fibers, polyamide fibers and mixtures thereof. Referring to FIG. 21 the enclosure 2000 may have an elevated protective rim 2012 substantially surrounding a perimeter of the enclosure. This rim may be further reinforced with stiffeners made of steel or other hard material that are integrally embedded into the enclosure so that the stiffeners provide additional strength and protection to the enclosed devices, as shown in FIG. 13B. An adjustable heavy-duty handle 2014 may be attached to or integrally designed into protective enclosure 2000 to allow easy and reliable transportation.

Figure 22:
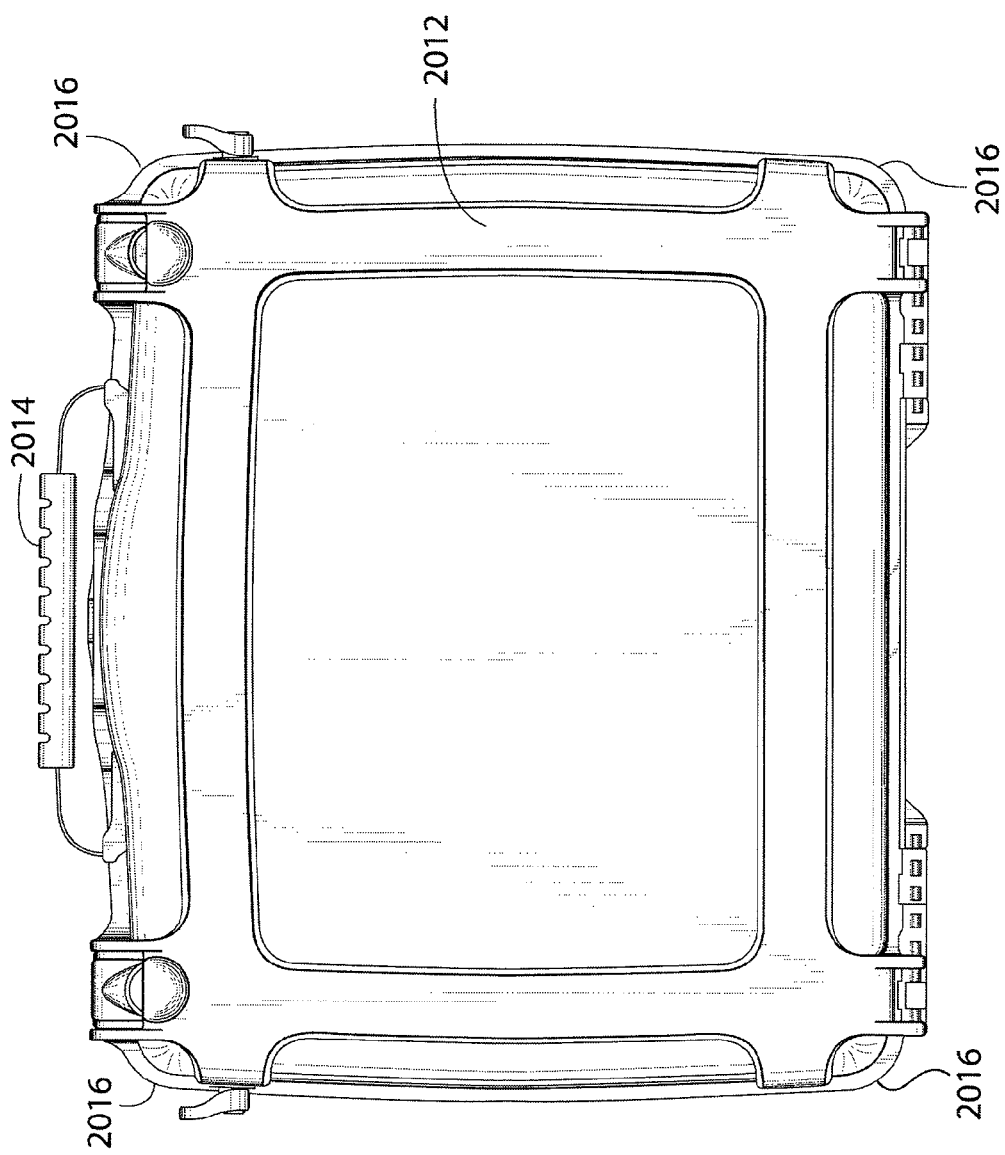
FIG. 22 is a top view of the protective enclosure of FIG. 21.

FIG. 22 illustrates the top of the enclosure wherein heavy-duty corner bumpers, such as bumper 2016, provide additional protection against mechanical shock and are securely attached to the corners of the base. The ribs 2012 also substantially surround a perimeter of the base of the enclosure.

Figure 23:
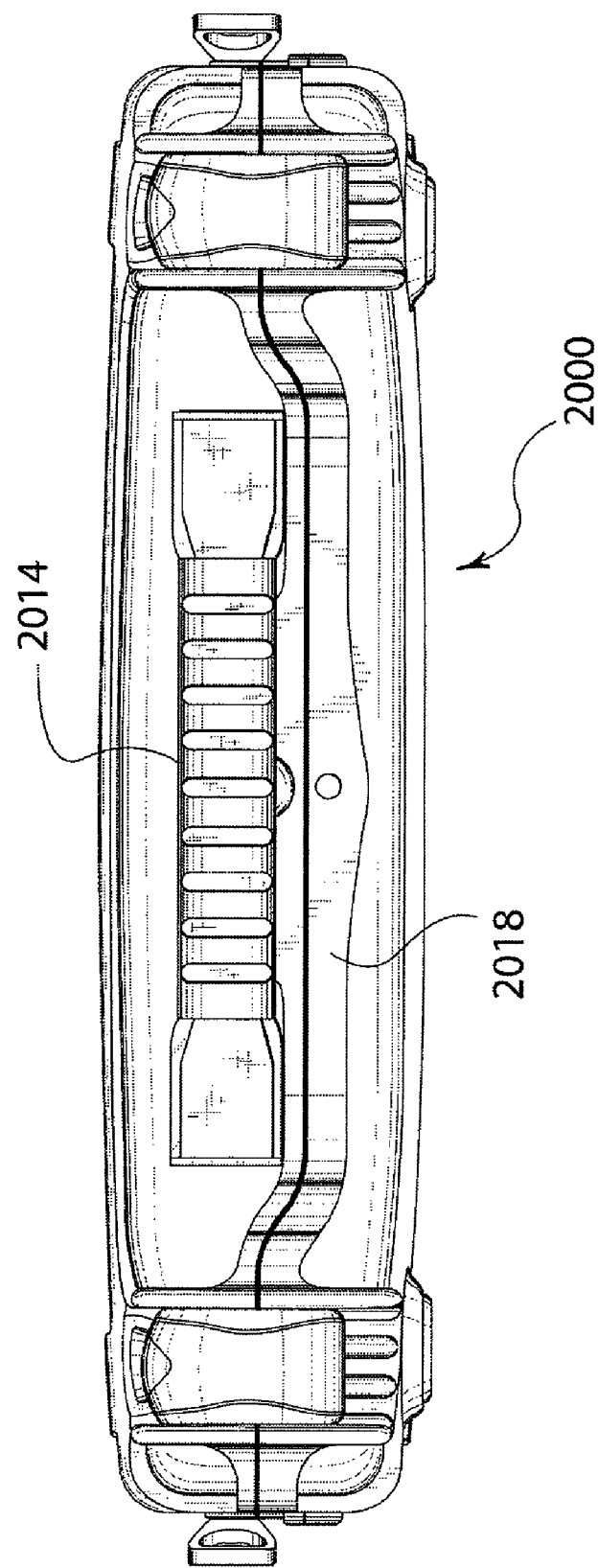
FIG. 23 is a front view of the embodiment of FIG. 21.
Figure 24:
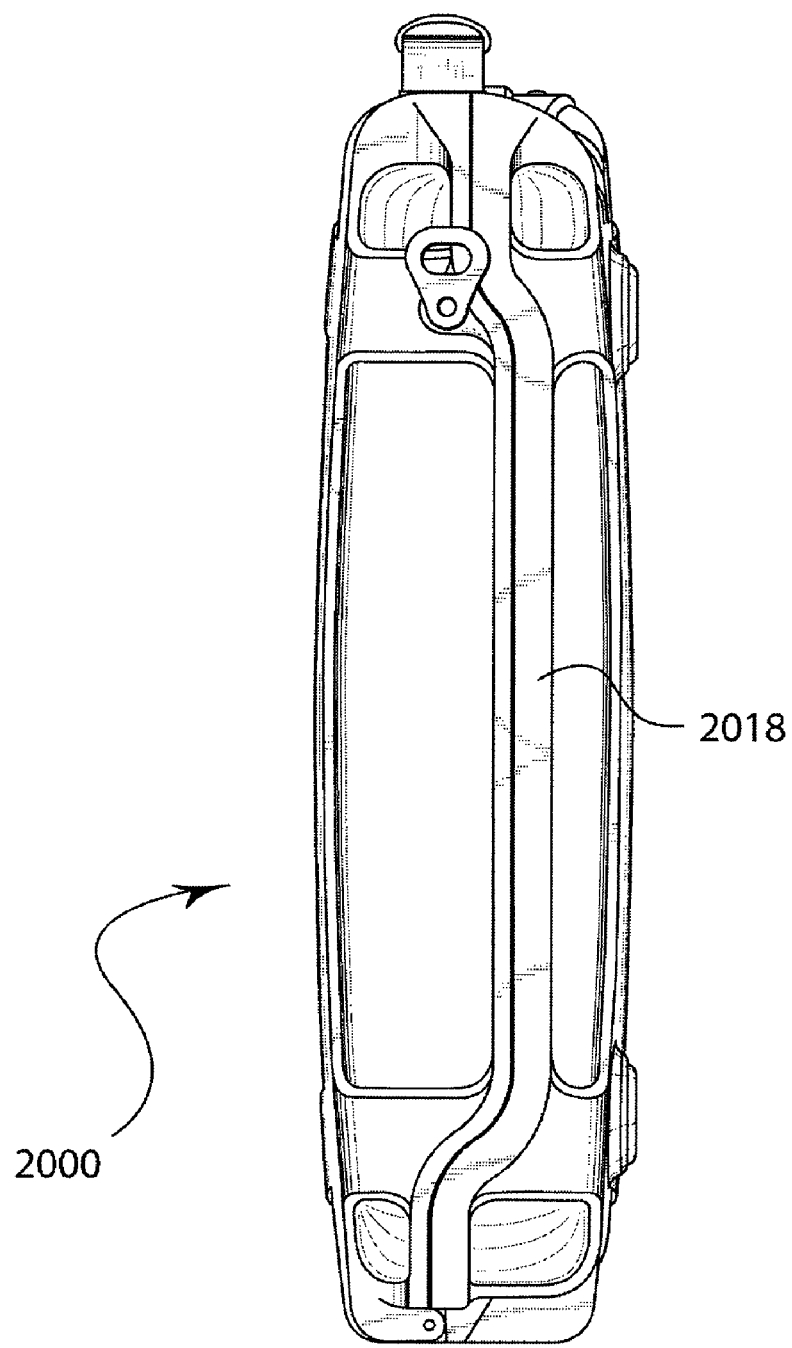
FIG. 24 is an end view of the embodiment of FIG. 21.

FIG. 23 illustrates a front view of the protective enclosure 2000. An additional protective rib 2018 is provided along the front of the case and extends around the case on the ends, as shown in FIG. 24, which includes an o-ring seal.

Figure 25:
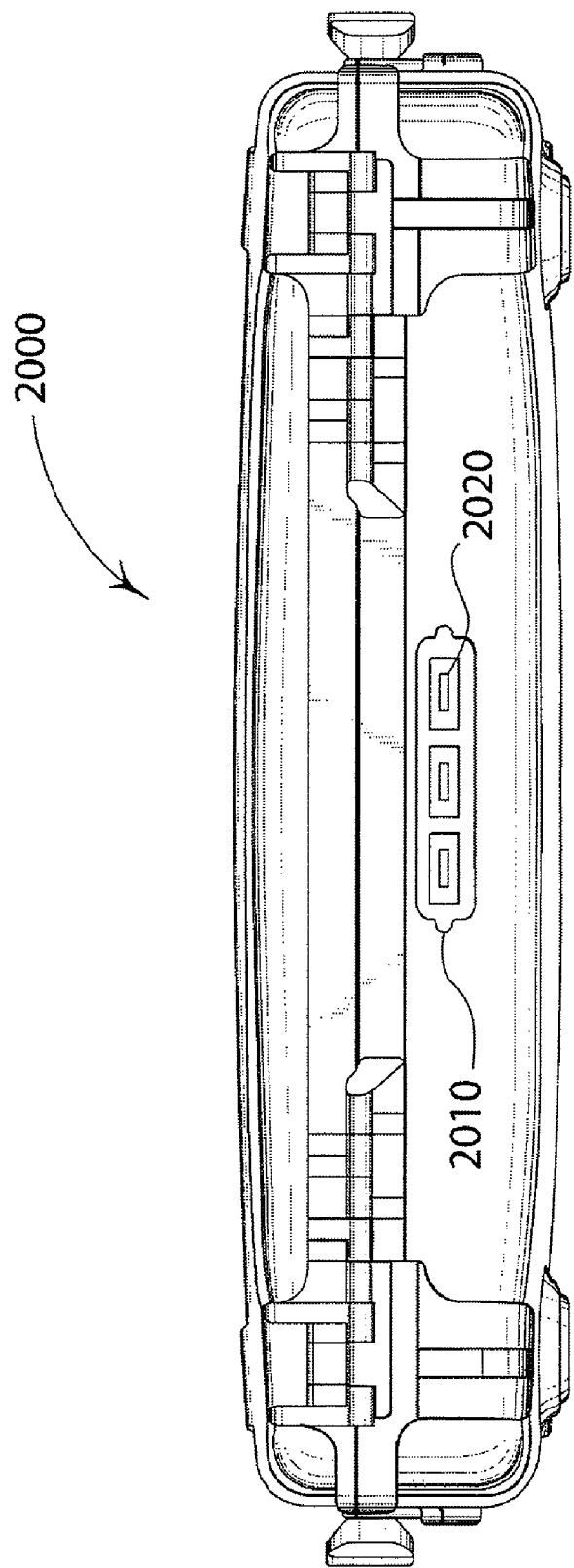
FIG. 25 is a back view of the embodiment of FIG. 21.

FIG. 25 illustrates the back of the protective enclosure wherein an opening 2010 is provided in the protective enclosure 2000 which is sealed with a rubber plug 2020. The plug 2020 of the USB hub is shown in more detail in FIG. 26. The USB cable hub allows the protective enclosure 2000 to be wired for both power as well as USB connections. In addition, provisions may be made to provide ventilation for the enclosure through opening 2010.

Figure 26:
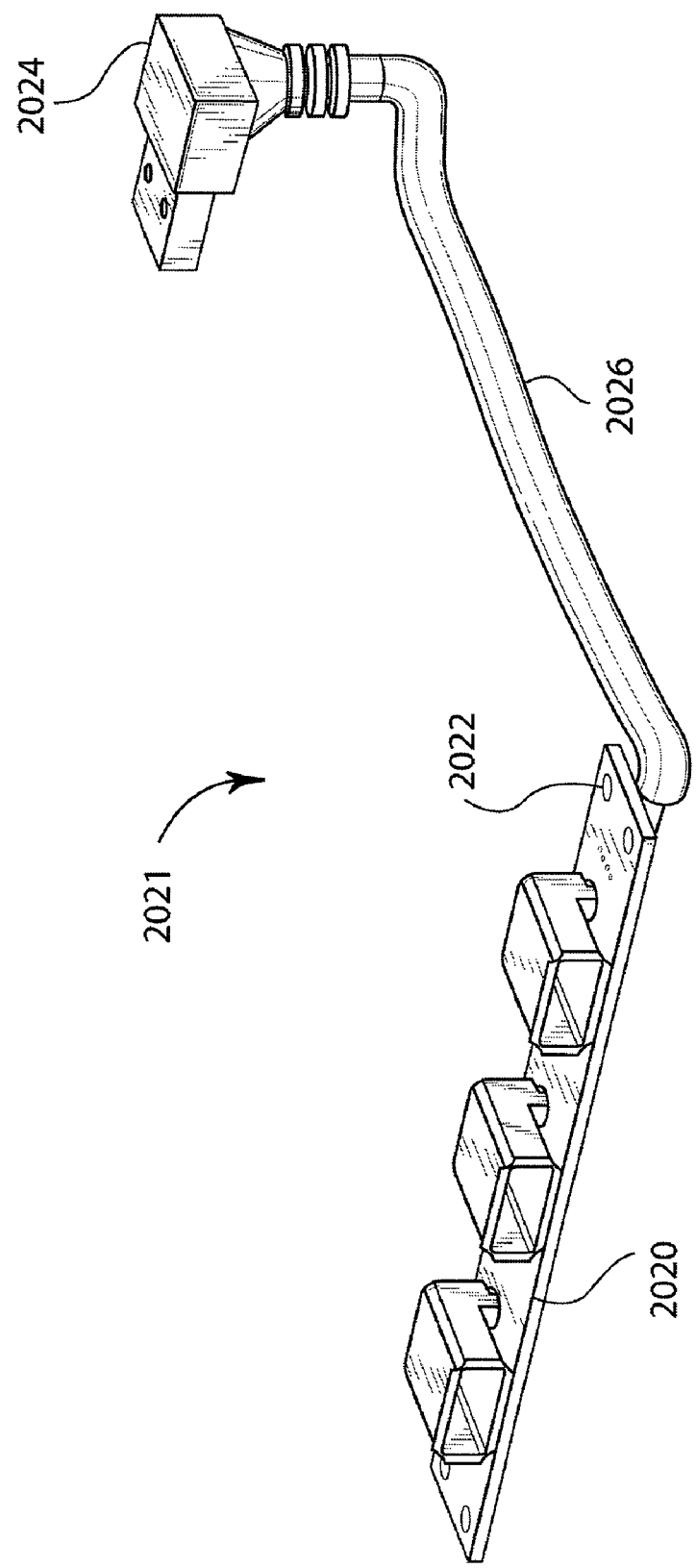
FIG. 26 is a perspective view of a USB hub.

FIG. 26 illustrates the USB hub 2021. The hub has mounting apertures such as 2022 that are disposed to receive fasteners to mount the hub inside of the protective enclosure 2000. A USB connector 2024, that is disposed to connect to a USB slot in a computer laptop or PC tablet computer, is connected by a cable 2026 to the hub 2020.

Figure 27:
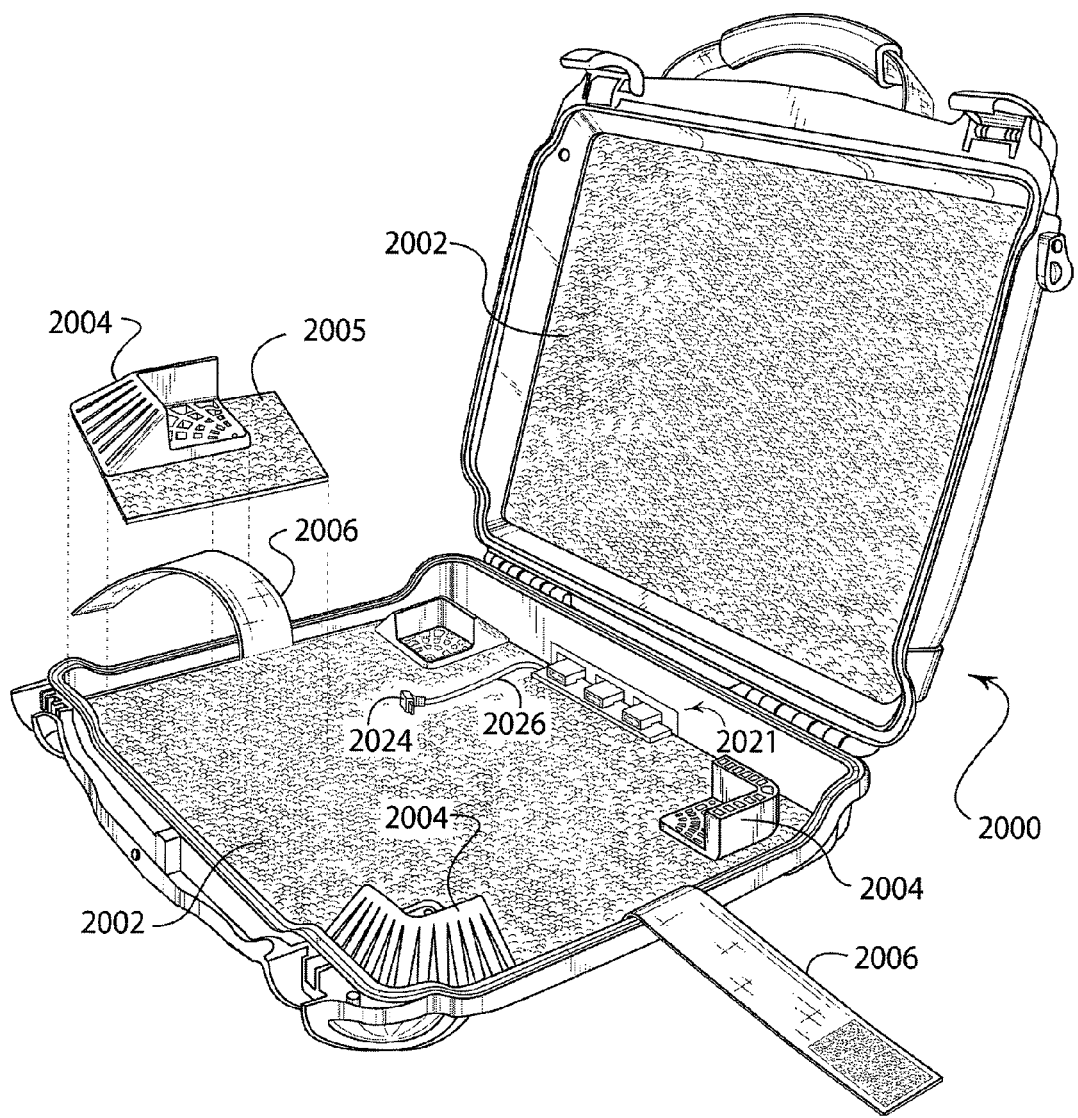
FIG. 27 is a perspective view of a USB hub mounted on the inside of the enclosure of FIG. 21.

FIG. 27 illustrates the integrated USB hub 2021 mounted in the enclosure 2000. The cable 2026 and USB connector 2024 allow a laptop computer or other computer to be connected to the USB hub 2021. The corner bumpers 2004 are disposed to be removeably attached to the enclosure lining 2002 so that the computer may be moved to a new location or the inside of the protective enclosure. The hook and loop liner 2005, that is attached to the base of the shock absorbing corner bumpers 2004, extends beyond the base dimensions by a predetermined amount to increase the adhesion between the bumpers 2004 and liner 2002 of the enclosure 2000.

Figure 28:
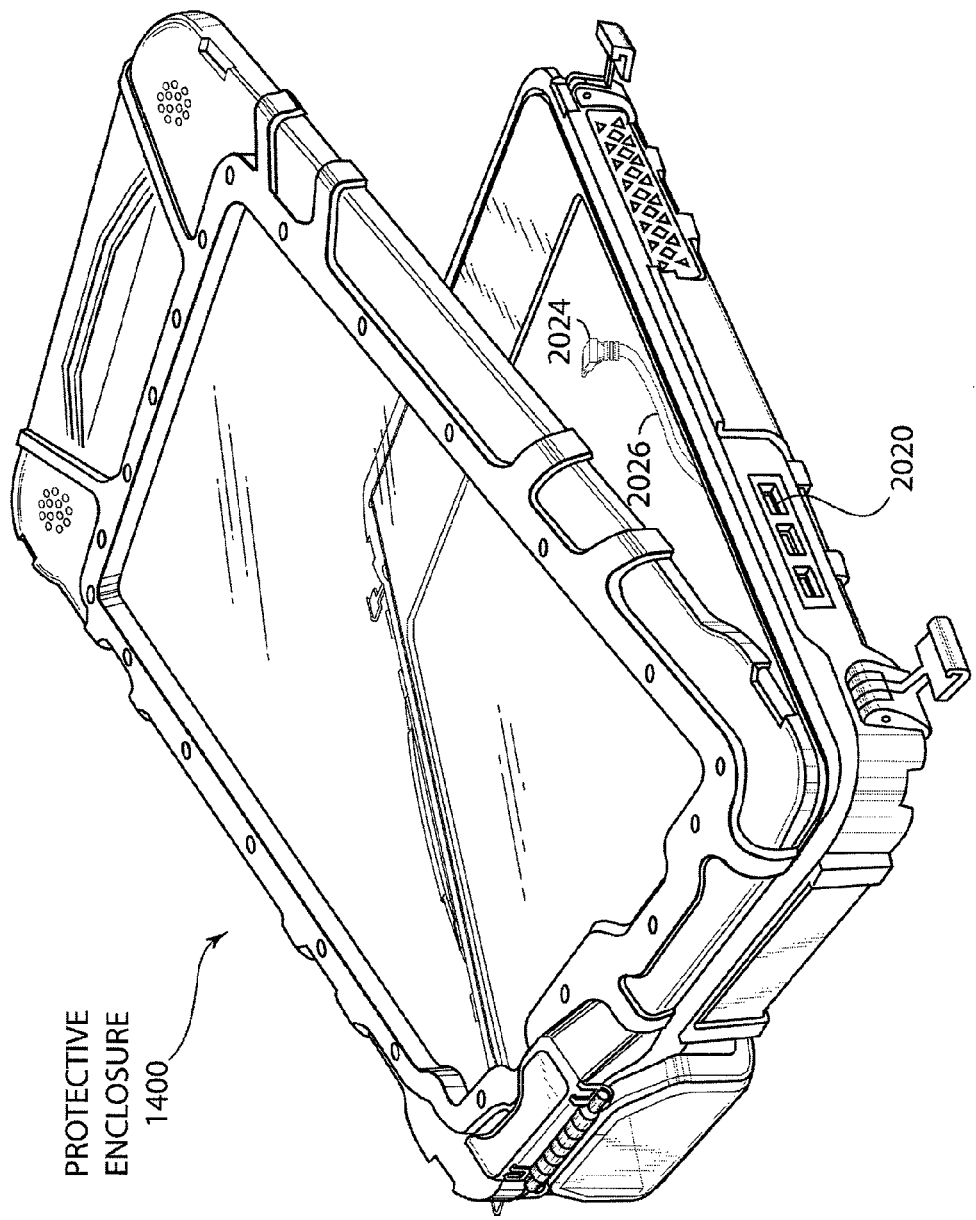
FIG. 28 is a perspective view of the USB hub mounted inside the enclosure of FIG. 14.

FIG. 28 illustrates how the USB assembly comprising the hub 2021, cable 2026, and connector 2026 may be mounted in an enclosure for a PC tablet protective enclosure such as 1400 shown in FIG. 14.

Figure 29:
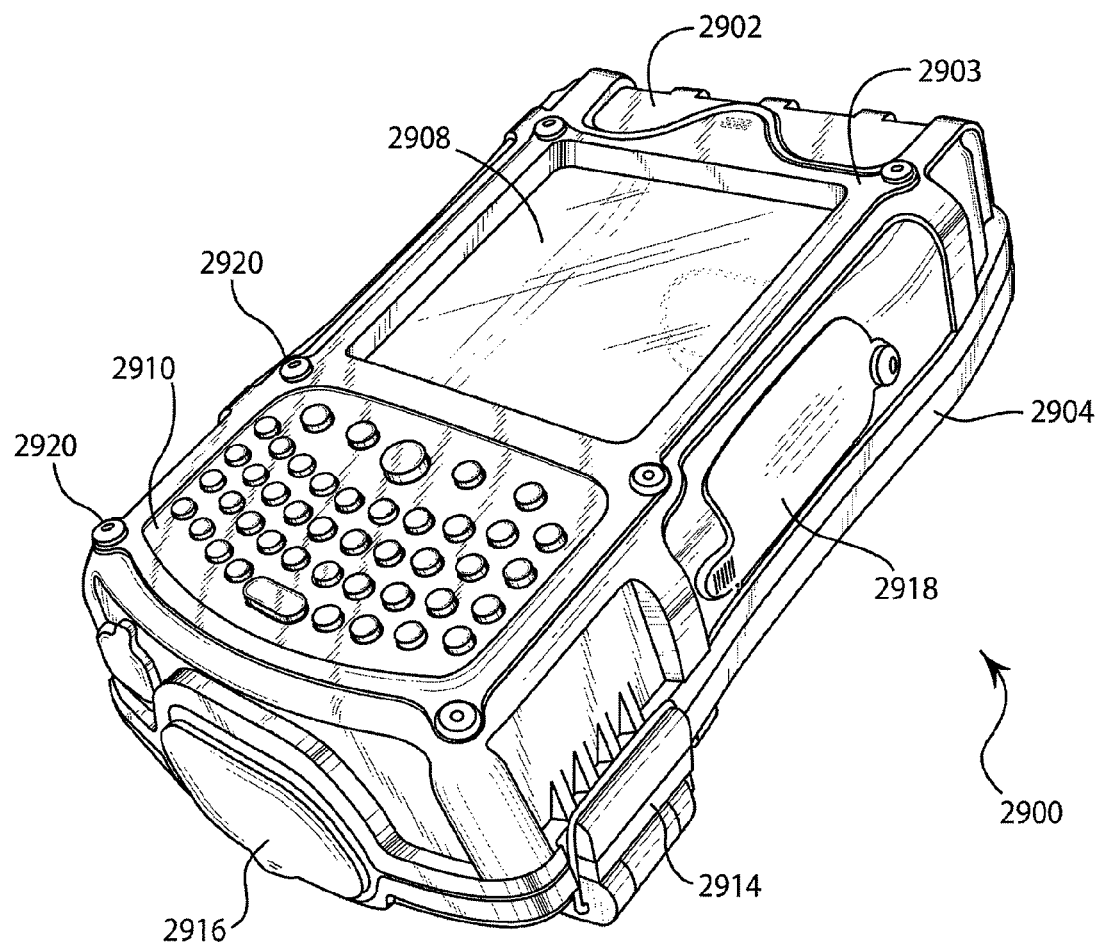
FIG. 29 is a perspective view of another embodiment of a protective case for a personal electronic device with integrated backlit keyboard.
Figure 30:
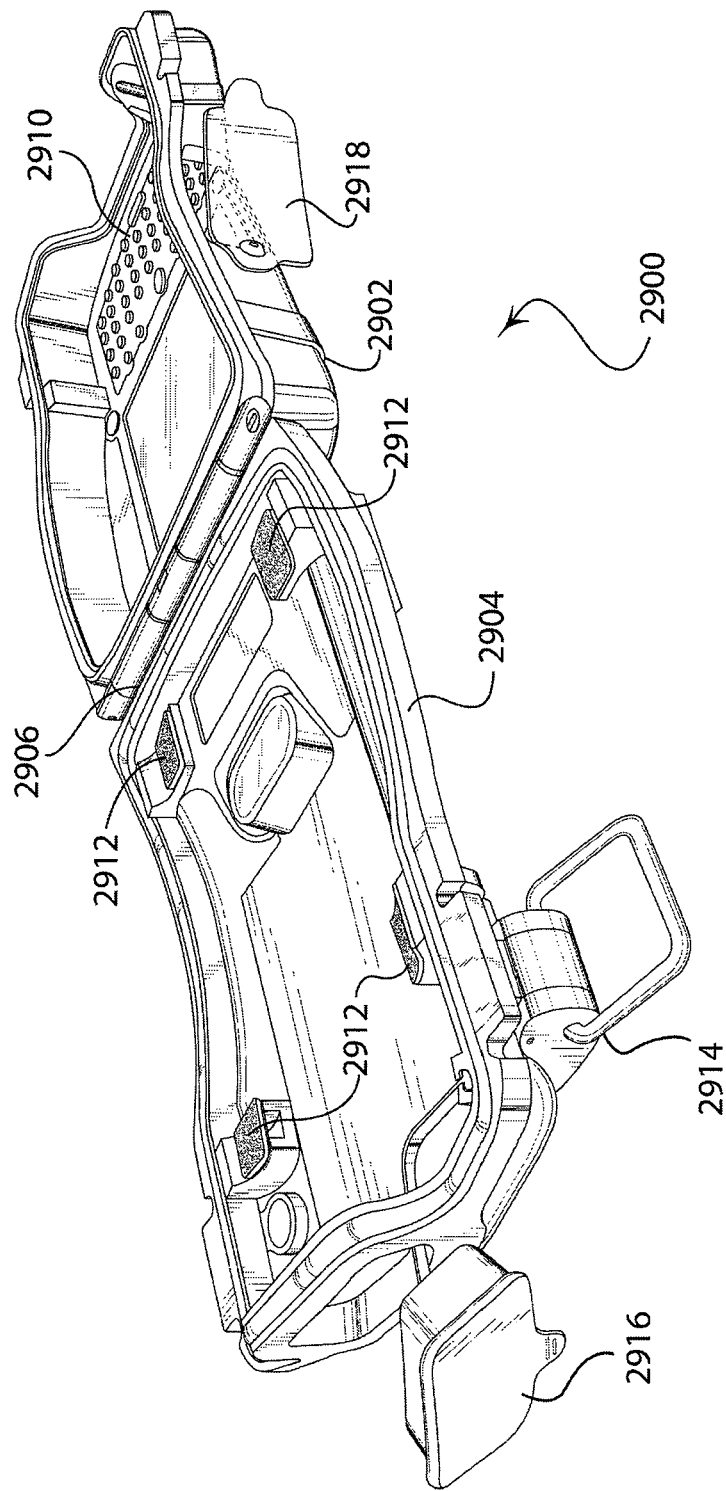
FIG. 30 is a perspective view of the embodiment of FIG. 29 in an open position.

FIGS. 29 and 30 illustrate a personal electronic device with an electronic alphanumeric keyboard enclosed in a protective case 2900. The personal electronic device is not shown but it may be any one of several devices such as Palm Pilot, Handspring Visor, Compaq Ipaq, Hewlett Packard Jornada, or similar products use a touch screen for display and alphanumeric keyboard for data entry. The protective case 2900 is comprised of a keyboard design that allows the user to use the keyboard of the electronic device directly through the keyboard of the protective case 2900. This protective case is also designed for rugged industrial use, recreational use, commercial use, or many other uses. The protective case is watertight, chemically resistant, protects the unit when dropped, and is crush proof. Depending on the application the protective case may be constructed of rigid plastic, metal, flexible rubber, or any other type of material that could be adapted to afford the protection of the personal electronic device desired for the application.

Protective case 2900 also comprises a rigidly molded front shell 2902 and rear shell 2904. A hinge 2906 joins front shell 2902 and rear shell 2904. As described above the protective case has a protective membrane 2908 covering the touch screen of the personal electronic device that is comprised of a sheet of thin plastic. The plastic is selected to be thin enough that the deformation of a stylus conducts the touch to the touch screen, but thick enough to have enough rigidity that the stylus does not catch and rip the membrane.

The protective case 2900 can also be used with handheld electronic devices that have an interactive flat-panel control because they also benefit from being enclosed in a rugged protective enclosure 2900 that is crush-resistant, watertight and shock-resistant and that simultaneously allows the user to interact with a sensitive interactive flat-panel control. Handheld electronic devices that have interactive flat-panel control may include music players, MP3 players, audio player/recorders, video players, walkie-talkies, navigational devices, smart phones, telematic devices, satellite phones and computers, including handheld computers, tablet computers, laptop computers and ultra-mobile computers. For example, Apple Computer iPod® is a popular handheld interactive device that plays MP3 or otherwise digitally-encoded music/audio. The Apple iPod® has an interactive flat-panel control in which a portion of the front panel is a flat-panel display and portion of the front panel is an interactive flat-panel control, called a touch wheel in some versions of the iPod® and click wheel in other versions of the iPod®, that has capacitive touch/proximity sensors. One function of the interactive flat-panel control, i.e. touch wheel, emulates a rotary control knob by sensing circular motion of a user's finger using capacitive sensors. The click wheel has the same function with the additional feature of sensing proximity of a user's finger and emulating button presses by a user's finger at pre-determined areas.

The protective membrane 2908, illustrated in FIG. 29, may have capacitive sensors which are part of a proximity/touch detector circuit. When a grounded object, such as a person's finger, which has free air capacitance of several hundred picofarads, is brought close to the capacitive sensors, the total capacitance measured by the detector circuit increases because the capacitance of the object with free air capacitance adds to the capacitance of the sensors since the total capacitance of two capacitors in parallel is additive. Multiple sensors may also be arranged so that movement of an object with free air capacitance can be detected, for example, movement of a person's finger in a circular motion analogous to turning a mechanical control knob. Some examples of interactive flat-panel controlled personal electronic device's include iPod® and iPod® Mini music and audio players from Apple Computer. In some personal electronic devices, such as the Apple iPod®, capacitive sensors may be disposed below a front panel made from a dielectric such as polycarbonate which has a dielectric constant in the range of 2.2-3.8.

In the embodiment of FIG. 29, the protective control membrane 2908 is made of thin polycarbonate or PVC that is slightly flexible or other engineered thermoplastics that provide the rugged watertight protection and at the same time permit the capacitive sensors function correctly. Likewise, a protective control membrane 2908 with a dielectric constant that is too high may retain an electric charge long enough to reduce the response rate of the sensor to motion of a user's finger from one capacitive sensor zone of the interactive flat-panel control of the electronic device to another. A protective control membrane 2908 that is conductive or has a dielectric constant that is too low may diminish the sensitivity of the capacitive sensor by combining in series the capacitance of the protective membrane and the dielectric front panel of the personal electronic device which results in a lowering of the overall capacitance.

Total capacitance between an object, such as a finger touching the protective control membrane 2908, and interactive flat-panel control of the electronic device is a function of the thickness and the dielectric constant of the protective control membrane 2908. The capacitance between the object, such as a finger, and the capacitive sensors of the interactive flat-panel control of the electronic device is proportional to the distance between the object and the sensors. The sensitivity of the capacitive sensors to the object may be diminished or completely eliminated if the protective control membrane 2908 is too thick. In the embodiment of FIG. 13, the thickness of the protective control membrane is approximately 0.020 inches. The protective control membrane 2908 may be any thickness in the range of 0.003 inches to 0.060 inches that is adequate to provide a rugged watertight membrane through which capacitance can be correctly sensed by the interactive flat-panel control of the electronic device.

A different or the same protective membrane keyboard 2910 may be disposed to cover the alphanumeric keyboard section of the personal electronic device. The protective membrane keyboard 2910 is printed with the same design of the keyboard of the electronic device that is disposed to be enclosed in the protective case 2900 so as to have total interface with the enclosed keyboard. The alphanumeric keys and function keys are transparent so that back light from the keyboard of the electronic device is seen. The user can type on the protective membrane keyboard 2910 so that backlighting from the keyboard of the personal electronic device actually lights up the keyboard so that the user can see what was typed into the electronic device. This allows the user to use the keyboard of the electronic device directly through the keyboard of the protective case 2900.

As illustrated in FIG. 29, the touch screen 2908 and the keyboard 2910 are attached to the protective case 2900 by a single frame 2903. The keyboard protective membrane 2908 and the touch screen protective membrane 2910 may be a single framed unit that attaches to the case using fasteners such as 2920.

As shown in FIG. 30, the personal electronic device is held in place by resting in molded features of two halves of a protective case 2902 and 2904. Depending on the type of personal electronic device and the manufacturer, the personal electronic device is designed to meet the specifications so that the personal electronic device may mount on the shock absorbing cushions 2912. The case may be then closed and sealed utilizing the clamps 2914. Once closed and sealed access to the personal electronic device may be obtained utilizing the access ports 2916 and 2918. Also, once the personal electronic device is sealed in the case the protective keyboard membrane 2910 faces and matches the keyboard of the personal electronic device device.

Figure 31:
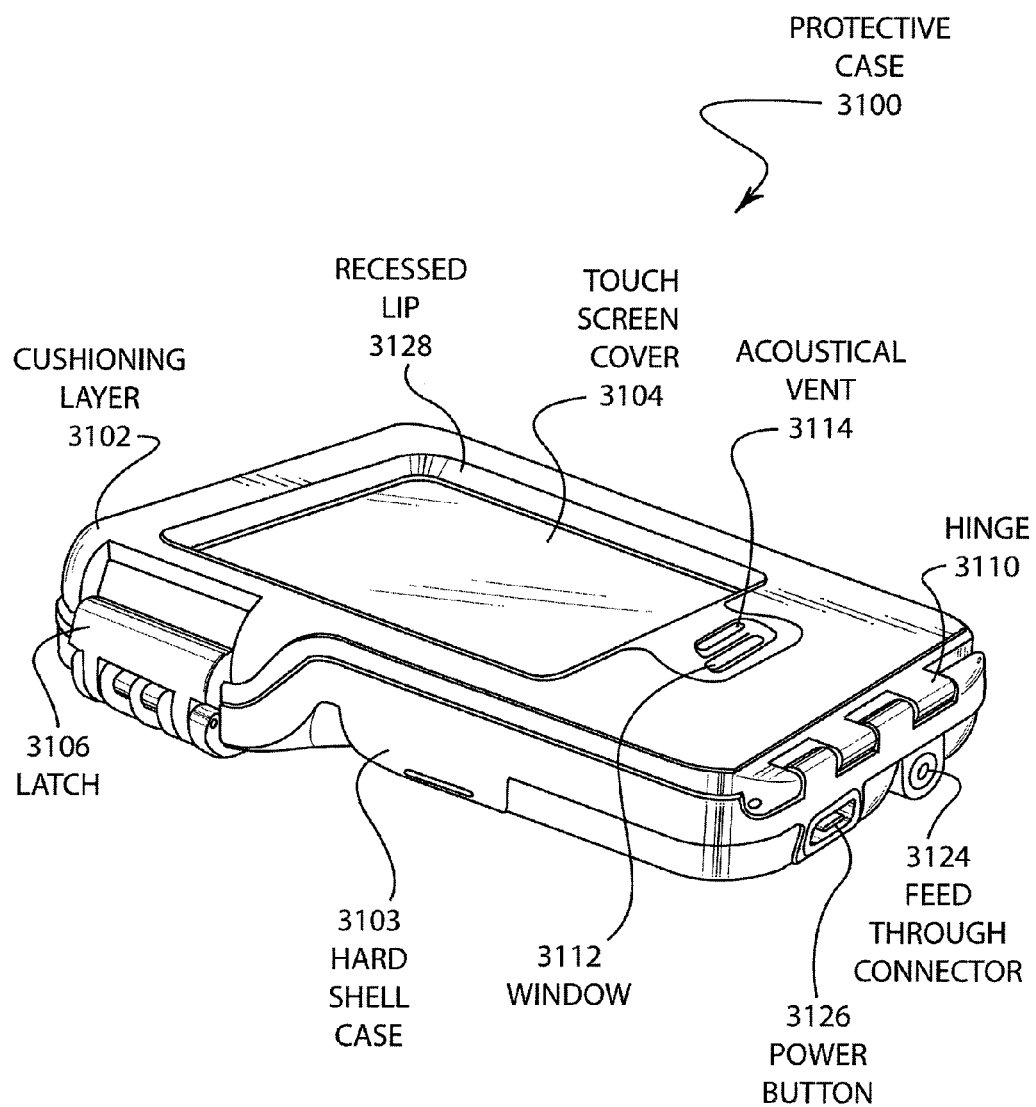
FIG. 31 is a perspective view of another embodiment of a protective case.
Figure 32:
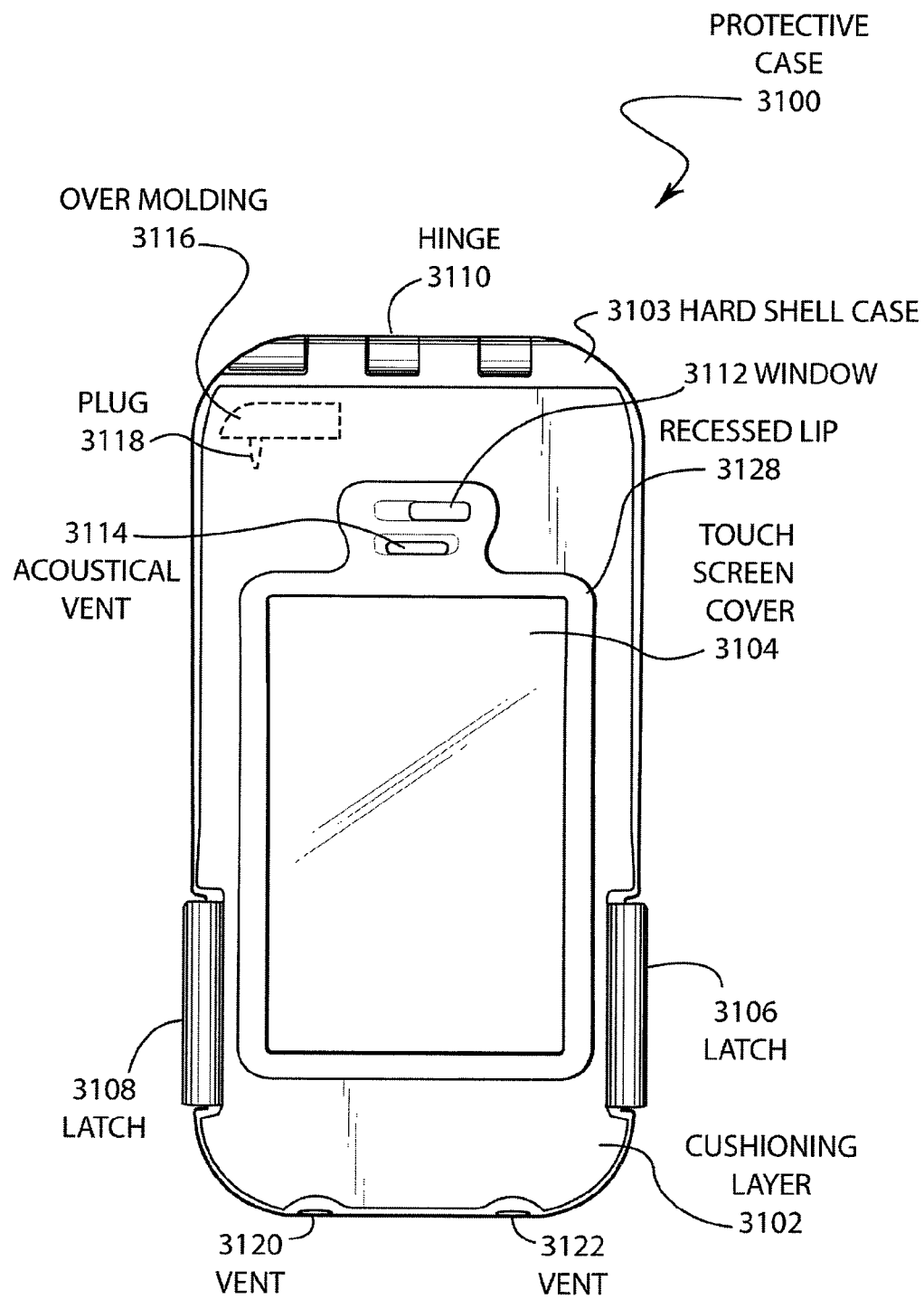
FIG. 32 is a top view of the embodiment of FIG. 31.
Figure 33:
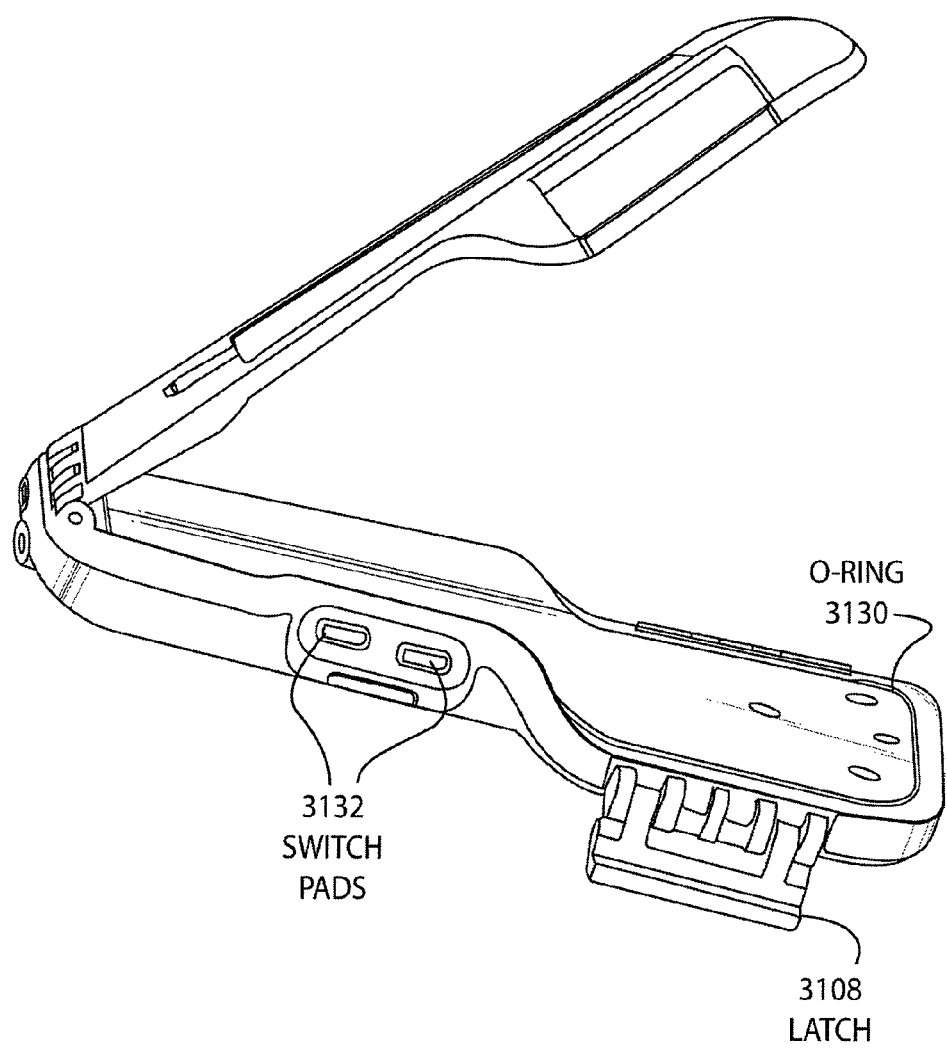
FIG. 33 is a side perspective view of the embodiment of FIG. 31.

FIGS. 31, 32 and 33 disclose another embodiment of a protective case 3100. As illustrated in FIGS. 31-33, the protective case 3100 includes a cushioning layer 3102 that is disposed on the surface of the hard shell case 3103 that cushions the protective case 3100 and the enclosed electronic device in drop situations. The cushioning layer absorbs impact shocks and prevents impact shocks from being transmitted to the enclosed electronic device. The cushioning layer can be attached directly to the hard shell case 3103 and may comprise any of the cushioning materials disclosed above. The hard shell case is made of a rigid plastic that has a flexural modulus of at least approximately 310 kilo pounds per square inch, so that the shell is substantially crush-resistant. The touch screen cover 3104 can be made of an engineered thermoplastic, including thermoplastic polycarbonate, thermoplastic polypropylene, thermoplastic acrylonitrile-butadiene-styrene, or thermoplastic compositions containing a mixture of these materials that has a thickness in the range of approximately 0.003 inches to 0.020 inches. Further, the protective shell can be reinforced with a fiber material, such as glass fibers, carbon fibers, metal fibers, polyamide fibers and mixtures thereof. A touch screen cover 3104 is attached to the hard shell case below a recessed lip 3128. The touch screen cover 3104 can be permanently attached to the hard shell case 3103 using various methods, such as disclosed above, or can be removeably attached with an adhesive or other methods known in the art. The touch screen cover 3104 is recessed below the recessed lip 3128 to provide additional protection to the touch screen of the electronic device that is placed in the protective case 3100. In addition, the mounting of the touch screen cover 3104 on the bottom portion of the hard shell case 3103 results in the touch screen cover 3104 being disposed adjacent to the electronic device disposed in the protective case 3100. The touch screen cover 3104 can be a separate membrane or glass sheet, as disclosed above, or can be integrally formed from the material of the hard shell case 3103. Latches 3106, 3108 securely hold the halves of the hard shell case 3103 in a locked position to provide a watertight crush-proof protective case 3100. The top and bottom portions of the hard shell case 3103 are connected by the hinge 3110. The hinge 3110 may allow the two halves of the hard shell case 3103 to rotate to a 180° open position or may include a stop that prevents the halves from opening greater than a predetermined amount, such as illustrated in FIG. 33. By limiting the amount that the two halves of the hard shell case 3103 open, the angle at which the electronic device is inserted and removed from the hard shell case 103 is limited. This protects the plug 3118, that is mounted in the flexible overmolding 3116, which allows a certain angle of deflection, such as disclosed in U.S. patent application Ser. No. 11/676,986, by Curtis R. Richardson, et al., filed Feb. 20, 2007, and U.S. patent application Ser. No. 11/077,963, by Curtis R. Richardson, filed Mar. 10, 2005, which are specifically incorporated herein by reference for all that they disclose and teach. Sealing gasket (o-ring) 3130 interacts with a ridge (not shown) on the upper portion of the hard shell case to provide a watertight seal for the protective case 3100.

Feed-through connector 3124 provides waterproof electrical connections through the case. Feed-through connector 3124 is connected to the plug 3118. The upper portion of the hard shell case 3103 includes a window 3112 that provides information from the electronic device. Acoustical vent 3114 is a waterproof acoustical vent that allows for the passage of acoustical waves to and from the electronic device. Both the window 3112 and the acoustical vent 3114 are designed to interface with a current model of the first generation iPhone® that is produced by Apple Corporation. Switch pads 3102 comprise sealed pads with a membrane that allows the pads to be depressed and interact with push buttons on the side of the iPhone®. Power button 3126 interacts with the power button on the electronic device.

Hence, the protective case 3100 provides a watertight crush-proof case that allows full interaction with an electronic device, such as an iPhone®, and allows full functionality of the electronic device from the exterior of the protective case 3100. Further, the electronic device can be easily inserted and removed from the case and provide a full electrical connection through the feed-through connectors 3124, 3126 in a simple, quick and easy fashion, without the necessity of hand plugging a separate cord into the electronic device from the protective case 3100. In addition, cushioning is provided that protects the electronic device in drop situations.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A protective enclosure for an electronic device having an interactive control panel comprising:

a protective shell that surrounds and encloses said electronic device when said electronic device is disposed in said protective shell, and that is crush resistant and impact resistant, said electronic device being a separate unit from said protective enclosure, said electronic device being insertable in and removable from said protective shell by hand;

an aperture in said shell that is aligned with said interactive control panel when said electronic device is disposed in said protective enclosure; and a protective membrane that is removably attached to said protective shell so that said protective membrane is disposed over and adjacent to said interactive control panel of said electronic device when said electronic device is disposed in said enclosure, said protective membrane being recessed from an outer surface of said protective shell, said protective membrane and said protective shell forming a protective enclosure for said interactive control panel that surrounds and encloses said electronic device, said protective membrane being sufficiently thin to allow inputs on a front side of said protective membrane to be communicated to said interactive control panel.

2. A protective enclosure of claim 1 wherein said interactive control panel of said electronic device is a capacitance-sensing interactive control and said protective membrane is made from a material that has a dielectric constant that allows capacitive inputs on a front side of said protective membrane to be transmitted to said capacitance-sensing interactive control of said electronic device.

3. The protective enclosure of claim 1 wherein said protective shell is formed from a polycarbonate material having sufficient thickness to make said protective shell substantially crush-resistant.

4. The protective enclosure of claim 1 wherein said protective shell is made of a rigid plastic that has a flexural modulus of at least 310 kilo pounds per square inch so that said protective shell is substantially crush-resistant.

5. The protective enclosure of claim 1 wherein said protective shell of said protective enclosure further comprises grip-enhancing structures that enable said protective enclosure to be securely held by hand in slippery conditions and provides cushioning in drop situations.

6. The protective enclosure of claim 1 wherein said protective shell is made of at least one engineered thermoplastic selected from the group consisting of thermoplastic polycarbonate, thermoplastic polypropylene, thermoplastic acrylonitrile-butadiene-styrene and thermoplastic compositions containing one or more thereof.

7. The protective enclosure of claim 1 wherein said protective shell is reinforced with at least one fiber material selected from the group consisting of glass fibers, carbon fibers, metal fibers, polyamide fibers and mixtures thereof.

8. The protective enclosure of claim 7 wherein said protective shell further comprises stiffeners that are embedded in a perimeter that surrounds said protective membrane of said protective shell so that said stiffeners strengthen said protective shell and prevent said protective shell from warping.

9. The protective enclosure of claim 1 wherein said protective membrane comprises a layer of glass.

10. The protective enclosure of claim 1 wherein said protective membrane comprises a layer of polycarbonate.

11. The protective enclosure of claim 1 wherein said protective membrane comprises a layer of PVC.

12. The protective enclosure of claim 1 wherein said protective membrane comprises a layer of silicon.

13. The protective enclosure of claim 1 further comprising:
a transparent window in said shell that is aligned with a display screen of said electronic device when said electronic device is disposed in said protective enclosure, said display screen being separate from said interactive control panel.

14. A method of manufacturing a protective enclosure for an electronic device having an interactive control panel comprising:
providing a protective shell that surrounds and encloses said device when said device is disposed in said shell and that is substantially crush resistant and impact resistant, said device being a separate unit from said protective enclosure, said device being insertable in and removable from said protective shell by hand;
providing an aperture in said protective shell that is aligned with an interactive control panel when said device is disposed in said protective enclosure;
providing a protective membrane that is sufficiently thin to allow inputs to a front side of said protective membrane to be communicated to said control panel; and
removably attaching a protective membrane to said protective shell so that said protective membrane is disposed over and adjacent to said interactive control panel of said device when said device is disposed in said enclosure and recessed from an outer surface of said protective shell, said protective membrane and said protective shell forming a protective enclosure for said interactive control panel that surrounds and enclosed said electronic device, said protective membrane being sufficiently thin to allow inputs on a front side of said protective membrane to be communicated to said interactive panel.

15. The method of claim 14 wherein said protective membrane has a dielectric constant that allows capacitive inputs on a front side of said protective membrane to be communicated to a capacitance-sensing interactive touch screen control on said electronic device through said protective membrane.

16. The method of claim 14 wherein said process of providing a protective membrane comprises attaching a layer of glass to said protective shell.

17. The method of claim 14 wherein said process of removably attaching a protective membrane to said protective shell comprises removably attaching a layer of polycarbonate to said protective shell.

18. The method of claim 14 wherein said process of removably attaching a protective membrane to said protective shell comprises removably attaching a layer of PVC to said protective shell.

19. The method of claim 14 wherein said process of removably attaching a protective membrane to said protective shell comprises attaching a layer of silicon to said protective shell.

20. The method of claim 14 wherein said process of providing a protective shell comprises providing a protective shell that is formed from a polycarbonate material having sufficient thickness to make said protective shell substantially crush-resistant.

21. The method of claim 14 wherein said process of providing a protective shell comprises providing a protective shell that is made of a rigid plastic that has a flexural modulus of at least 310 kilo pounds per square inch so that said protective shell is substantially crush-resistant.

22. The method of claim 14 wherein said process of providing a protective shell comprises providing a protective shell that has grip-enhancing structures that enable said protective enclosure to be securely held by hand in slippery conditions and cushions said electronic device in drop situations.

23. The method of claim 14 wherein said process of providing a protective shell comprises providing a protective shell that is made of at least one engineered thermoplastic selected from the group consisting of thermoplastic polycarbonate, thermoplastic polypropylene, thermoplastic acrylonitrile-butadiene-styrene and thermoplastic compositions containing one or more thereof that has a thickness in the range of approximately 0.003 inches to 0.020 inches.

24. The method of claim 14 wherein said process of providing a protective shell comprises providing a protective shell that is reinforced with at least one fiber material selected from a group consisting of glass fibers, carbon fibers, metal fibers, polyamide fibers and mixtures thereof.

25. The method of claim 14 wherein said process of providing a protective shell comprises providing a protective shell that comprises stiffeners that are embedded in a perimeter that surrounds said protective membrane of said shell so that said stiffeners strengthen said shell and prevent said shell from warping.

26. The method of claim 14 further comprising:
providing a transparent window in said shell that is aligned with a display screen of said device when said device is disposed in said protective enclosure, said display screen being separate from said interactive control panel.

* * * * *